United States Patent
Blitzer et al.

(10) Patent No.: US 8,600,952 B2
(45) Date of Patent: *Dec. 3, 2013

(54) TECHNIQUES FOR PROCESSING RECOVERY POINTS

(75) Inventors: Aharon Blitzer, Shoham (IL); Aviram Katz, Kirvat Onno (IL); David Barta, West Roxbury, MA (US); Michael Specht, Acton, MA (US); Yaron Dar, Sudbury, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/440,186

(22) Filed: Apr. 5, 2012

(65) Prior Publication Data

US 2012/0191663 A1    Jul. 26, 2012

Related U.S. Application Data

(63) Continuation of application No. 12/286,374, filed on Sep. 29, 2008, now Pat. No. 8,185,505, which is a continuation-in-part of application No. 12/214,667, filed on Jun. 20, 2008, now Pat. No. 7,840,595.

(51) Int. Cl.
*G06F 17/00* (2006.01)
*G06F 7/00* (2006.01)

(52) U.S. Cl.
USPC .................... 707/674; 711/164; 711/103

(58) Field of Classification Search
None
See application file for complete search history.

(56) References Cited

U.S. PATENT DOCUMENTS

| | | | | |
|---|---|---|---|---|
| 5,280,611 | A * | 1/1994 | Mohan et al. | 1/1 |
| 6,578,041 | B1 * | 6/2003 | Lomet | 1/1 |
| 6,665,814 | B2 * | 12/2003 | Hobson et al. | 714/16 |
| 7,072,912 | B1 * | 7/2006 | Verma et al. | 1/1 |
| 7,360,123 | B1 * | 4/2008 | Westenberg et al. | 714/47.2 |
| 7,389,300 | B1 * | 6/2008 | Shah et al. | 1/1 |
| 7,412,460 | B2 * | 8/2008 | Hrle et al. | 707/648 |
| 7,415,488 | B1 * | 8/2008 | Muth et al. | 707/648 |
| 7,657,578 | B1 * | 2/2010 | Karr et al. | 707/610 |
| 7,730,489 | B1 * | 6/2010 | Duvur et al. | 718/104 |
| 7,840,673 | B1 * | 11/2010 | O'Crowley | 709/226 |
| 8,307,238 | B1 * | 11/2012 | Schmokel et al. | 714/1 |
| 2002/0099765 | A1 * | 7/2002 | Otis | 709/203 |
| 2004/0039959 | A1 * | 2/2004 | LeCrone et al. | 714/6 |
| 2004/0103109 | A1 * | 5/2004 | Huras et al. | 707/100 |
| 2004/0260726 | A1 * | 12/2004 | Hrle et al. | 707/104.1 |
| 2005/0102670 | A1 * | 5/2005 | Bretl et al. | 718/1 |
| 2006/0288183 | A1 * | 12/2006 | Boaz et al. | 711/164 |

* cited by examiner

*Primary Examiner* — Usmaan Saeed
*Assistant Examiner* — Dung K Chau
(74) *Attorney, Agent, or Firm* — Muirhead and Saturnelli, LLC

(57) ABSTRACT

Described are techniques for processing recovery points. One or more storage objects for which data protection processing is performed are determined. The data protection processing includes copying data for each of said one or more storage objects to one or more data protection storage devices. One or more recovery points corresponding to each of said one or more storage objects are determined. For each of the one or more recovery points corresponding to each of the one or more storage objects, performing processing including determining whether said each recovery point is at least one of recoverable in accordance with recoverable criteria and restartable in accordance with restartable criteria.

18 Claims, 24 Drawing Sheets

| Category | RPO | RTO | Retention/ Copies | Data Protection Method | RP Location | Frequency |
|---|---|---|---|---|---|---|
| Logical Corruption | 15 min | 60 min | 8 | Snap | Local | Hourly |
| Operational Recovery | 15 min | 60 min | 1 | Copy | Local | Every 4 hours |
| Disaster Recovery | 15 min | 4 hrs | 1 | Continuous | Remote | Continuous |
| Long Term Retention | 1 week | 24 hrs | 52 | Backup | Local or remote | Weekly |

FIG. 2

| Facility | RP Replication Type | DP Method |
|---|---|---|
| BCV | PIT | Copy |
| BCV | PIT-Consistent | Copy |
| Clone | PIT | Copy |
| Clone | PIT-Consistent | Copy |
| Snap | PIT | Snap |
| Snap | PIT-Consistent | Snap |
| RDF | Continuous | Remote-Continuous |
| RDF/PIT | PIT | Remote-Copy |
| RDF/PIT | PIT-Consistent | Remote-Copy |
| NetBackup | PIT | Backup |
| NetWorker | PIT | Backup |

FIG. 5

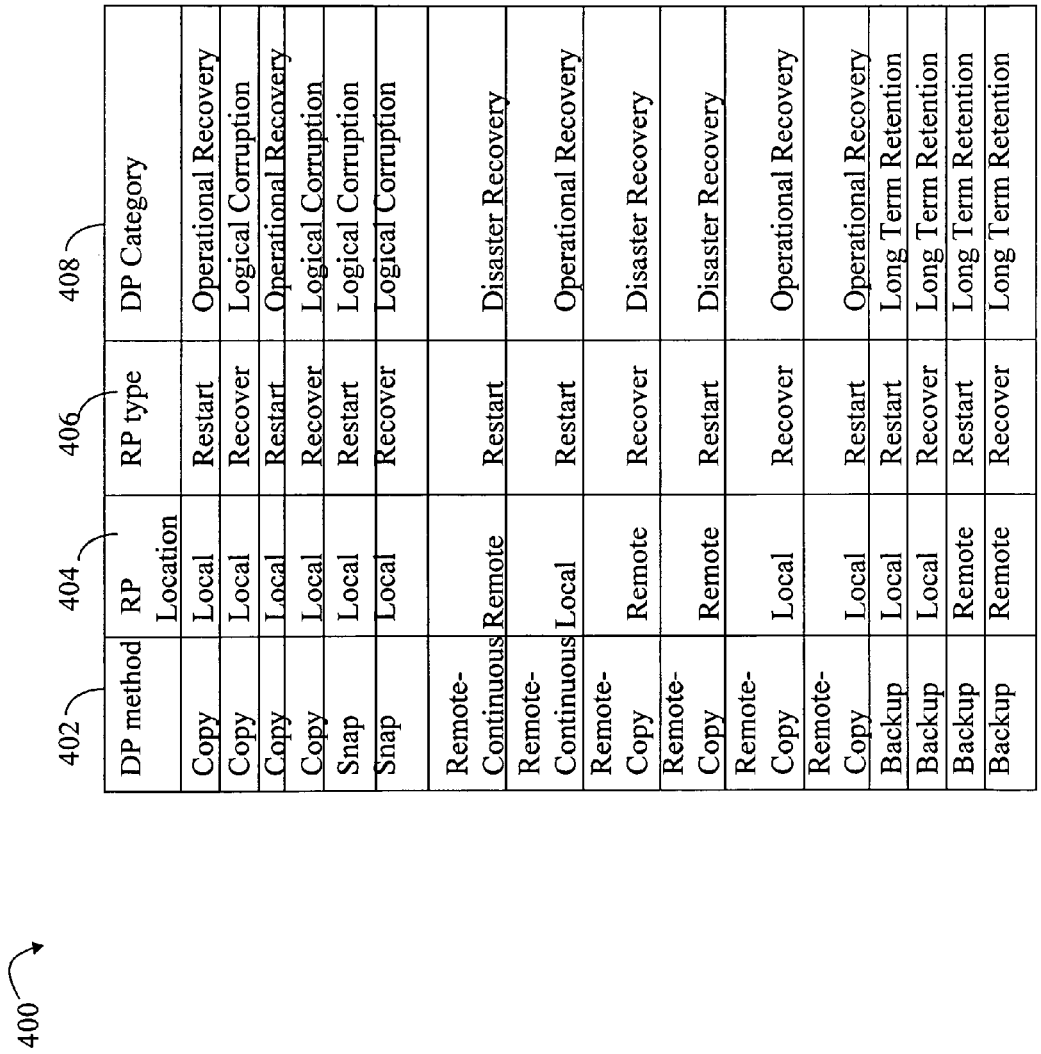

| DP method | RP Location | RP type | DP Category |
|---|---|---|---|
| Copy | Local | Restart | Operational Recovery |
| Copy | Local | Recover | Logical Corruption |
| Copy | Local | Restart | Operational Recovery |
| Copy | Local | Recover | Logical Corruption |
| Snap | Local | Restart | Logical Corruption |
| Snap | Local | Recover | Logical Corruption |
| Remote-Continuous | Remote | Restart | Disaster Recovery |
| Remote-Continuous | Local | Restart | Operational Recovery |
| Remote-Copy | Remote | Recover | Disaster Recovery |
| Remote-Copy | Remote | Restart | Disaster Recovery |
| Remote-Copy | Local | Recover | Operational Recovery |
| Remote-Copy | Local | Restart | Operational Recovery |
| Backup | Local | Restart | Long Term Retention |
| Backup | Local | Recover | Long Term Retention |
| Backup | Remote | Restart | Long Term Retention |
| Backup | Remote | Recover | Long Term Retention |

FIG. 6

TECHNIQUES FOR PROCESSING RECOVERY POINTS

CROSS REFERENCES TO RELATED APPLICATIONS

This application is a continuation of U.S. patent application Ser. No. 12/286,374, filed Sep. 29, 2008, now U.S. Pat. No. 8,185,505 "TECHNIQUES FOR PROCESSING RECOVERY POINTS", Blitzer et al., which is a continuation in part of U.S. patent application Ser. No. 12/214,667, filed Jun. 20, 2008, now U.S. Pat. No. 7,840,595, TECHNIQUES FOR DETERMINING AN IMPLEMENTED DATA PROTECTION POLICY, all of which are incorporated by reference herein.

BACKGROUND

1. Technical Field

This application generally relates to data storage, and more particularly to techniques used in connection with determining characteristics of protected data.

2. Description of Related Art

Computer systems may include different resources used by one or more host processors. Resources and host processors in a system may be interconnected by one or more communication connections. These resources may include, for example, data storage devices such as those included in the data storage systems, such as the data storage arrays manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes (LVs). The logical disk units may or may not correspond to the actual disk drives. Allowing multiple host systems to access the single storage device unit allows the host systems to share data stored therein.

Different techniques may be used in connection with providing data protection. Data protection may be provided by a data protection process that makes a copy of an original set of data. The copy of data may be used upon the occurrence of an event causing data failure such as may occur, for example, when the original copy of data is destroyed, corrupted, or otherwise unavailable. Different strategies may be used to provide data protection for different types of failures that can occur. A data protection policy (DPP) may be designed to meet data protection criteria or objectives determined in a variety of different ways. Such criteria may be specified in a service level agreement (SLA), by management or administrators, and the like. Once designed, the DPP may then be implemented. In connection with determining an implemented DPP, and more generally for other applications and uses of the protected data, it may be desirable to determine characteristics about the protected data using automated techniques.

SUMMARY OF THE INVENTION

In accordance with one aspect of the invention is a method for processing recovery points comprising: determining one or more storage objects for which data protection processing is performed, said data protection processing including copying data for each of said one or more storage objects to one or more data protection storage devices; determining one or more recovery points corresponding to each of said one or more storage objects; and for each of said one or more recovery points corresponding to each of said one or more storage objects, performing processing including determining whether said each recovery point is at least one of recoverable in accordance with recoverable criteria and restartable in accordance with restartable criteria. The restartable criteria may include determining whether elements required to recover a storage object are included in images of a recovery point. The restartable criteria may include determining whether a recovery point is dependent write consistent, and whether images of the recovery point are created with a same protection action if required. The restartable criteria may include determining whether a recovery point is valid to assess a state of data in the recovery point related to whether the recovery point can be used to perform recovery for a storage object. Determining whether a recovery point is valid in connection with said restartable criteria may include determining that no errors are generated as a result of data protection processing that creates images included in the recovery point. The recoverable criteria may include determining whether elements required to recover a storage object are included in images of a recovery point. The recoverable criteria may include determining whether a recovery point is valid to assess a state of data in the recovery point related to whether the recovery point can be used to perform recovery for a storage object. Determining whether a recovery point is valid in connection with said recoverable criteria may include determining that no errors are generated when data protection processing creates images included in the recovery point. The recoverable criteria may include determining whether an application using data of a storage object is in a correct mode when a data protection process is performed for the storage object which creates images included in a recovery point. The correct mode may be a backup mode that said application is required to be in when performing the data protection process, and the recoverable criteria may include determining whether corresponding actions exist in a file indicating whether processing is performed to place said application in said backup mode prior to performing the data protection process and, if required, whether processing is performed to take said application out of backup mode after performing the data protection process. At least one additional storage object may be created while performing the data protection process creating images included in a recovery point, and the recoverable criteria may include determining whether said at least one additional storage object is covered by the recovery point. At least one recovery point may be determined as both recoverable and restartable. If a recovery point is recoverable, the method may include determining whether the recovery point is associated with one or more log files providing for rolling the recovery point forward in time where the recovery point reflects a state of data of a corresponding storage object at a first point in time and the one or more log files are used to roll the recovery point forward in time to a second point in time subsequent to the first point in time. A restartable recovery point may be a recovery point for which after a set of images comprising said recovery point is restored, no additional processing is needed prior to using data of said recovery point that has been restored. A restartable recovery point may be a recovery point that cannot be rolled forward in time to reflect a state of the data of the recovery point at a later time. A recoverable recovery point may be a recovery point for which, after a set of images comprising said recovery point is restored, additional processing is performed in order to use data of said recovery point that has been restored. A recoverable recovery point may be a recovery point that can be optionally rolled forward in time to reflect a state of data of the recovery point at a later time and the additional processing may reconstruct a working data set. At least one of the storage objects may be a file system, data used by an application, a file, a directory, a physical device, a logical device, or a portion of a device. A set of one or more recoverability times for a first storage object may be determined based on a set union of recoverability times for one or more recovery points associated with said first storage object. If a first recovery point associated with said first storage object is recoverable and has at least one log file used to roll the first recovery point forward in time, the set of one or more recoverability times may include a time span corresponding to a range of time values indicated by said at least one log file, and wherein if a second recovery point associated with said first storage object is restartable, the second recovery point may not be rolled forward and the set of one or more recoverability times may include a second recoverability time for said second recovery point. If a third recovery point associated with said first storage object is recoverable and cannot be rolled forward, the set of one or more recoverability times may include a third recoverability time for said third recovery point. The set of one or more recoverability times may be displayed in connection with selecting a point in time for recovering the first storage object.

In accordance with another aspect of the invention is a computer readable medium comprising executable code stored thereon for determining an actual recovery point objective for a storage object, the computer readable medium comprising executable code for: determining one or more recovery points for the storage object; providing a first indicator for each of said one or more recovery points indicating whether said each recovery point is recoverable in accordance with recoverable criteria; determining a set of one or more recoverability times for each of said one or more recovery points, wherein, if said each recovery point is recoverable, a determination is made as to whether said each recovery point is associated with one or more logs used in connection with rolling said each recovery point forward in time, and wherein if said each recovery point is recoverable and has at least one log file used to roll said each recovery point forward in time, said set of one or more recoverability times includes a time span corresponding to a range of time values indicated by said at least one log file; determining a latest recoverability time for said one or more recovery points; and determining said actual recovery point objective as a difference between a current time and said latest recoverability time. The one or more recovery points may be associated with a same data protection category. The same data protection category for each of said one or more recovery points may be determined in accordance with a data protection method, a recovery point type, and a recovery point location associated with said each recovery point. The computer readable medium may further comprise executable code for providing a second indicator for each of said one or more recovery points indicating whether said each recovery point is restartable.

In accordance with another aspect of the invention is a system comprising: at least one data protection storage device; at least one data protection server providing data protection for at least one storage object by copying data for said at least one storage object to said at least one data protection storage device; and a computer readable medium comprising executable code stored thereon for: a) determining one or more storage objects for which said data protection is provided; b) determining one or more recovery points corresponding to each of said one or more storage objects, wherein each of said one or more recovery points that corresponds to a corresponding storage object includes a set of images to be restored in order to recover the corresponding storage object; c) determining a state associated with a storage object when performing data protection processing for the storage object; d) determining a replication type for a recovery point indicating whether said recovery point is dependent write consistent; e) determining, for a recovery point including images for a storage object, whether additional storage objects were created while performing a data protection process which created the images for the storage object; f) determining whether a recovery point is valid to assess whether a storage object can be recovered using the recovery point; and g) performing recovery point attribute analysis for a recovery point corresponding to a storage object, said recovery point attribute analysis including determining whether said recovery point is recoverable in accordance with recoverable criteria and determining whether said recovery point is restartable in accordance with restartable criteria, wherein a restartable recovery point is a recovery point for which after a set of images comprising said restartable recovery point is restored, data of the set of images is in a working state, wherein a recoverable recovery point is a recovery point for which, after a set of images comprising said recoverable recovery point is restored, additional processing is performed to place data of the recoverable recovery point in a working state.

BRIEF DESCRIPTION OF THE DRAWINGS

Features and advantages of the present invention will become more apparent from the following detailed description of exemplary embodiments thereof taken in conjunction with the accompanying drawings in which:

FIG. 2 is an example illustrating in tabular form information that may be included in a DPP;

FIGS. 5 and 6 illustrate different mapping rules that may be used in an embodiment in performing the techniques herein;

DETAILED DESCRIPTION OF EMBODIMENT(S)

Figure 1:
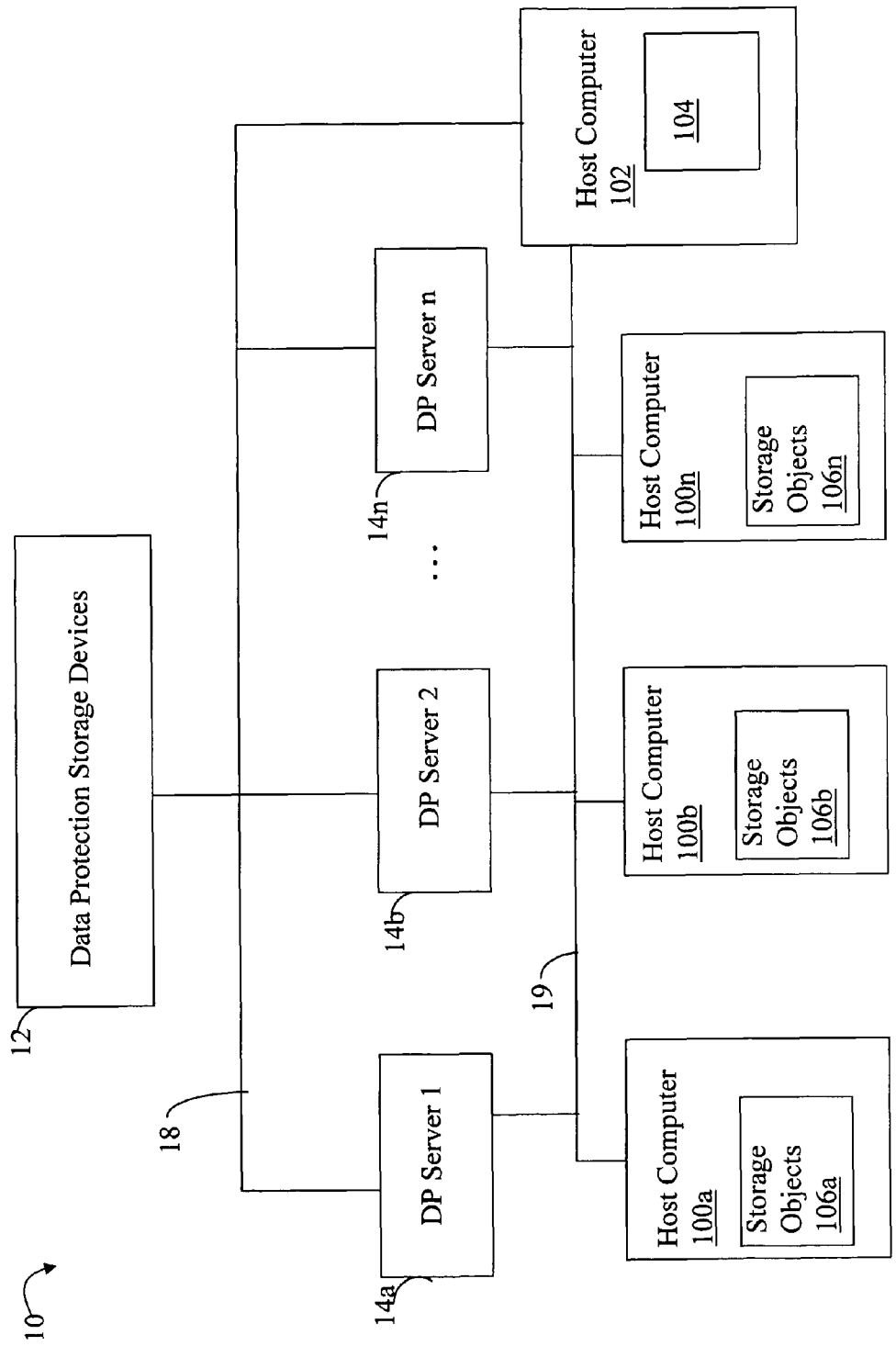
FIG. 1 is an example of an embodiment of a computer system that may utilize the techniques described herein.

Referring to FIG. 1, shown is an example of an embodiment of a system 10 that may be used in connection with performing the techniques described herein. Shown in the example system 10 are data protection (DP) servers 14a-14n, data protection (DP) storage devices 12, host computers 100a-100n, and 102, and communication mediums 18 and 19. The system 10 includes DP storage devices 12 connected to DP servers 14a-14n through communication medium 18. The hosts 100a-100n and 102 may communicate with DP servers 14a-14n through communication medium 19. The host 102 may also communicate with the DP servers 14a-14n over communication mediums 18 and/or 19. The communication mediums 18 and 19 may be any one or more of a variety of networks or other type of communication connections as known to those skilled in the art. Each of the communication mediums 18 and 19 may be a network connection, bus, and/or or other type of data link, such as a hardwire or other connections known in the art. For example, the communication mediums 18 and/or 19 may be the Internet, an intranet, network or other wireless or other hardwired connection(s) which facilitate communications between the different components.

The example 10 of FIG. 1 illustrates one type of computing and communications environment in which data may be copied from the host computers 100a-100n to one or more DP storage devices 12 as part of performing a data protection process as described in more detail below. Each of the components in the example 10 may be connected to the illustrated communication mediums by any one of a variety of connections as may be provided and supported in accordance with the type of communication medium in an embodiment. The processors included in the host computers 100a-100n and 102 may be any one of a variety of proprietary or commercially available single or multi-processor system, such as an Intel-based processor, or other type of commercially available processor able to support traffic in accordance with each particular embodiment and application. Although not shown, each of 100a-100n and 102 may also include other elements included in a computer system such as, for example, an input device, output device, one or more storage devices including computer readable storage mediums, and the like. The computer readable medium may include, for example, forms of memory such as RAM, disk storage, flash memory devices, and the like. In one embodiment, code for performing the techniques herein may be stored on a computer readable medium. The code may be executed by a processor in connection with performing techniques herein.

It should be noted that the particular examples of the hardware and software that may be included in components of FIG. 1 are described herein in more detail, and may vary with each particular embodiment. Each of the components of FIG. 1 may all be located at the same physical site, or, alternatively, may also be located in different physical locations. Some or all of the connections by which the components of FIG. 1 may be connected to the communication mediums 18, 19 may pass through other communication devices, such as a Connectrix or other switching equipment that may exist such as a phone line, a repeater, a multiplexer or even a satellite.

Each of the DP servers 14a-14n may represent a set of software modules which performs one or more data protection processes to copy data of storage objects 106a-106n to one or more DP storage devices 12. Data protection processes are described in more detail in following paragraphs. Each of 14a-14n may perform data protection processing independent of the others. The DP servers may be installed and execute on one or more dedicated computer systems or other computing devices. Depending on the particular data protection process performed, the software modules, or a portion thereof, of a DP server may also be co-located with other software and/or hardware. For example, as described elsewhere herein, one type data protection provided may be continuous data protection (CDP) using RDF (Remote Data Facility) by EMC Corporation of Hopkinton, Mass. A portion of the hardware and/or software used in connection with providing RDF functionality may be included in a data storage system. CDP is generally described in more detail below.

Element 12 may represent one or more DP storage devices of one or more different types of devices. For example, DP storage devices may include tapes, disks, flash memory, remote network storage devices such as may accessible through a storage network, and the like. In one embodiment, element 12 may represent more than one data storage system or data storage array located locally or remotely with respect to each other and other components of FIG. 1.

Each of the computers 100a-100n may include, respectively, one or more storage objects 106a-106n. A storage object may be defined as an entity in the network for which data protection may be provided. Examples of a storage object include a file, a directory, a virtual or logical storage device, a computer, an application, configured logical partition of a physical or virtual device, and the like. It should be noted that although storage objects are shown as being stored on computers 100a-100n, a storage object may also be stored on another component included in, or which has connectivity to, the network and system of FIG. 1. Data protection may be provided by performing a data protection process using any one or more different data protection methods. The data protection process provides copies of data, or portions thereof, by copying data from an original source, such as data of a storage object from one of the computers 100a-100n, to the DP storage devices 12. The data of the storage object may be located, for example, on a device of a data storage system such as a data storage array where the device is mounted for use on one or more of the computers 100a-100n. Different data protection methods in which the original data may be copied may use different technologies in providing the data protection. For example, an embodiment using the techniques herein may use data protection methods including one or more methods for providing different types of data backups (e.g., a full backup, incremental backup, differential backup, replication backup, such as through mirroring or point in time copy of data, tape-based backup, disk-based backup, RAID (redundant array of independent disks), snapshots, continuous data protection schemes, and other methods used to more generally provide a copy of data for storage in DP storage devices 12. Continuous data protection (CDP) refers to a DP method of providing a copy of an original data set by automatically saving a copy of every change made to that data capturing every version of the data that the user saves. CDP allows the user or administrator to restore data to any point in time. It should be noted that some CDP technologies and products may gather a set of changes at discrete points in time on a continuous basis and provide for recovery to the discrete points in time. The changes in one set at a first discrete point in time may include changes since the previous discrete point in time.

Different facilities or products may be used in providing one or more data protection methods. As mentioned above, each data protection method may utilize a different underlying technology to provide data protection. Furthermore, an embodiment may use one or more facilities or products which each use a same DP method. For example, there may be 3 different software applications used to produce backup sets by performing a backup operation copying data to the DP storage. Each of the 3 software applications represent a different facility or means using the backup technology to obtain a copy of the original data in the DP storage. As another example, a version of RDF may be a facility providing continuous data protection. In an embodiment in which data storage systems are remote or local with respect to one another, the data storage systems may communicate with one another using RDF. The RDF functionality may be facilitated with a remote adapter which is an RDF adapter provided within communicating data storage systems. Communication between Symmetrix™ data storage systems using RDF is described, for example, in U.S. Pat. Nos. 5,742,792 and 5,544,347, both of which are incorporated by reference herein. Examples of different data protection methods and facilities that may be included in an embodiment using the techniques herein are described in more detail in following paragraphs and also known in the art.

The computer 102 may include one or more modules 104 including executable code for performing a variety of different tasks. The modules of 104 may perform processing as described in U.S. Patent Publication 2006/0288183 A1, U.S. patent application Ser. No. 11/403,745, filed on Apr. 12, 2006 (the '745 application), APPARATUS AND METHOD FOR INFORMATION RECOVERY QUALITY ASSESSMENT IN A COMPUTER SYSTEM, Boaz et al., which is incorporated by reference herein, for performing a recovery quality assessment. The modules of 104 may also perform processing for determining a currently implemented or configured DPP (data protection policy) using the techniques described herein. A DPP is described in more detail below. In connection with performing the assessment described in the '745 application, various types of information are collected and analyzed. An embodiment performing the techniques herein may use some of the information produced as a result of collecting and/or analyzing as described in the '745 application in determining the currently implemented or configured data protection policy as described herein. The '745 application describes obtaining information through collection and/or analysis. Such information may include, for example, when and/or how frequently data protection processing is performed, identifying data elements of the storage objects which are to be copied, source location (e.g., on the hosts 100a-100n) and target locations (e.g., location in the DP storage devices 12) for the data being protected, and the like. In addition to information described in the '745 patent application, other information used in connection with the techniques herein, such as facilities used to provide data protection, particular attributes about recovery points and images of the copies of the protected data, and the like, may also be stored on the host computer 102, obtained from the DP servers and/or host computers, determined through further analysis, or otherwise obtained from another location, other data store or repository, other software modules, and the like, for use in connection with the techniques herein. Thus, in one embodiment, element 104 may collectively represent the software modules necessary to implement the IRQA (Information Recovery Quality Assessment) Apparatus as described in the '745 application, or portions thereof, and also the techniques herein for determining the implemented DPP. As another exemplary embodiment, an embodiment performing the techniques herein to determine a currently implemented DPP may obtain information directly from the DP servers, host computers, and/or other components rather than from the IRQA Apparatus as described in the '745 application. It should be noted that although element 104 is illustrated as being included in single computer system, the modules comprising 104, or portions thereof, may be included on one or more computer systems or other devices. Such computer systems or devices may also include other software and perform other processing than as described herein and in the '745 application.

A data protection policy (DPP) may define how data is protected upon the occurrence of different types of events or incidents that cause a data failure such as, for example, where the data is corrupted, destroyed or otherwise unavailable. Incidents may include, for example, local incidents such as building fires, regional incidents such as earthquakes, and human mistakes, such as deleting a set of data. Such events or incidents may be partitioned into 4 categories or groups—logical corruption, operational recovery, disaster recovery, and long term retention. It should be noted that an embodiment may include a different set of categories than as described herein. Operational recovery may refer to incidents causing a data failure due to failure of one or more physical components that may be located at a site. An example of an incident associated with operational recovery is a hard drive failure. Logical corruption may be characterized as a localized or site specific data corruption or failure that occurs due to a human mistake such as deleting a data set. Disaster recovery may be characterized as a site failure such as upon the occurrence of fire, earthquake, and the like, where data at an entire site or location may be destroyed. Long term retention may be characterized as events requiring recovery of data from a relatively long period of time, such as more than a day. As an example, a virus may corrupt a data set on a first day and the corruption may not be discovered until the next time the data set is used which may be, for example, a week. Upon discovery of the corrupted data set, it may be necessary to recover a previous version of the data set prior to corruption from a DP storage location used for long term retention. Each of the foregoing 4 categories may be referred to herein as a data failure category or DP category indicating a grouping of incidents for which data protection is provided. An embodiment may partition incidents in a manner differently than as described herein.

For each of the foregoing categories, a data protection strategy as specified in a DPP may be determined indicating how data protection is provided upon the occurrence of an event in that category. A DPP may be designed to meet data protection criteria or objectives determined in a variety of different ways such as may be specified in a service level agreement (SLA), by management or administrators, and the like. Such objectives or criteria may include a recovery point objective (RPO) and recovery time objective (RTO) and may be specified for each of the foregoing 4 categories. For each category of possible failures, an organization may specify a DPP including required RTO and RPO in order to avoid unacceptable consequences associated with a break in continuity of availability and usage. The Recovery Point Objectives (RPO) in conjunction with the Recovery Time Objective (RTO) may be used in designing a DPP. RPO may be defined as the amount of data lost upon the occurrence of an incident causing data failure where the amount of data lost is measured in time. RTO may be defined as the duration of time within which a business process should be restored after a data failure in order to avoid unacceptable consequences associated with a break in continuity regarding availability of the affected data. In one embodiment, an RPO and RTO may be specified for each of the foregoing four categories in connection with defining or designing a DPP. Once a DPP is designed, the DPP may be implemented to meet the specified RTOs and/or RPOs for the categories.

Referring to FIG. 2, shown is an example illustrating one way in which a DPP may be defined. Once the policy is defined, it may then be implemented. In connection with the techniques herein, an implemented DPP may also be referred to as a configured DPP. Data storage administrators, management, and/or others may define an instance of a DPP in the form of 100 of FIG. 2. The DPP may then be implemented by configuring the computing environment as illustrated in FIG. 1. Subsequently, the techniques herein described in following paragraphs may then be used to collect and analyze information about the implemented DPP and then provide the user with such information. The techniques herein may be used to determine an implemented DPP in an automated fashion and then expose or make visible the currently implemented DPP to a user, such as through a user interface. A user may want to know the currently implemented DPP, for example, for purposes of verifying that the implemented DPP meets criteria as may be included in an SLA. More generally, the user may want to verify that the implemented DPP meets the previously provided definition. Such verification may also be performed to demonstrate that an implemented DPP is in compliance with a regulation or other type of requirement. It may also be necessary to determine a currently implemented DPP when adding new devices, migrating data from an existing to a new device, and the like. As illustrated in connection with other figures and description herein, an embodiment may use the techniques herein to determine an implemented DPP as illustrated in FIG. 2 without the RTO. Thus, FIG. 2 also illustrates information of a currently implemented DPP that may be determined via data collection and analysis in accordance with an embodiment performing the techniques herein. An instance of the information in the table 100 may be defined and also implemented for each storage object. For example, if 5 file systems are to be protect, 5 different DPPs may be designed and implemented.

Referring to FIG. 2, shown is an example of a DPP as may be defined and also implemented in which different DP strategies are included for each of the four categories of possible incidents causing data failure. The table in the example 100 includes a first row 120a indicating the type of information included in each of columns 122, 124, 126, 108, 110, 112 and 114. Each of rows 120b-120e indicate information associated with one of the possible categories of data failures. The information in each of rows 120b-120e is an expression of the data protection strategy to provide data protection upon the occurrence of an incident causing data failure. Column 122 specifies the four data failure categories or DP categories described above. Column 124 specifies the RPOs. Column 126 specifies the RTOs. Column 108 specifies the number of copies or recovery points (RPs) included in the DP devices for a particular storage object. Column 108 indicates a number of data copies maintained so that when a new copy is created as a result of performing a DP process, an oldest retained copy may be replaced. An RP for a storage object may be characterized as a set of images that should all be restored in order to recover data for the storage object. Column 110 specifies the DP method used to provide data protection. Column 112 specifies the relative location of where the copies or RPs are stored. In this example, the RP location is indicated as local or remote with respect to where the original copy of the data is stored. Local indicates that the copy of the data, such as an RP, is located physically at the same site as the original data set. Remote indicates that the copy of the data is located at a physically remote location or site different from the location of the original data set. Frequencies are indicated in column 114. Values in column 114 indicate the frequency at which the data protection process is performed. As an example in which the table 100 of FIG. 2 represents a currently implemented DPP for a storage object, row 120b of table 100 indicates that the DP strategy used to provide data protection upon the occurrence of a logical corruption is performed using the DP method of snapshot taken hourly which stores the copy of the data locally. Currently, there are 8 RPs or copies retained and the RPO is 15 minutes and the RTO is 60 minutes.

In the example 100, DP methods illustrated are snap, copy, continuous and backup. Snap indicates that a snapshot of an original data set is made. In connection with a snapshot, changes are recorded with respect to a data set at a particular point in time. Using one snapshot technique often referred to as "copy on write", the data set may serve as a read-only base copy against which subsequent modifications are recorded, such as using a write log. When performing the data protection operation using the snapshot technique, the subsequent changes as included in the foregoing write log may be stored on a DP device, target location, while the base copy remains at the source location. In order to perform recovery, the base copy at the source location is needed as well as the copy of the write log from the target location on a DP device. Continuous indicates that continuous data protection (CDP) is provided as described elsewhere herein. Backup indicates that a copy of the data is provided using a backup technology such as by using full backups, incremental backups, and the like. Copy may generally refer to other techniques used to provide a replicate copy of a data set. The foregoing DP methods, as well as others that may be used in an embodiment in accordance with the techniques herein, are known in the art.

As an example of an RP, consider data used by an application that resides on C and E data drives. Each of the C and E drives has a different source location in one of the hosts and a different target drive in the DP storage devices 12. Images of both drives are needed for recovery for the application data and thus data from both drives is included in an RP for the application data. The DP method used performs a DP process to replicate both C and E drives to 2 other disks included in the DP storage devices 12. In order to perform a recovery operation for the application data, the copy of data for both the C and E drives need to be restored. Other data may need to be restored as also used by the application. For example, database or other logs as used by the application may also need to be saved to DP storage by the DP method for subsequent retrieval in connection with performing a recovery operation. As a result, when copying data to DP storage of element 12 for a data protection process, the log information may be subsequently copied in addition to other application data. Similarly, when performing a restoration operation, this log information is needed and included in the set of images for the RP. Each vendor, application, and the like, may have different data requirements and thus different data may be copied to the DP devices and also included in an RP for use when performing a restoration operation.

Different attributes may be associated with an RP. An RP may be recoverable, restartable, or both. A restartable RP may be characterized as an RP for which after the set of images is restored, no additional processing is needed to begin using the data such as with an application. Also, there is no option to roll-forward in connection with the restored data. In other words, the restored images of a restartable RP represent a set of data at a point in time and cannot be rolled forward or made to reflect the state of the data at any other subsequent point in time. Thus, two characteristics of a restartable RP are that no additional processing of the data is needed once RP data is restored in order to begin using the data, and there is no option to roll the restored data forward. A recoverable RP may be characterized as an RP where additional steps or subsequent actions are needed after restoring the RP from the DP storage in order for the restored data to be ready for use. The restored data may be optionally rolled forward to a later point in time. The subsequent actions may include, for example, performing processing needed to reconstruct a working data set for the application.

As an example of an RP that is restartable, consider an RP including data for an application. The RP includes a first set of data representing data at a first point in time. In connection with performing the data restoration to recover data to the first point in time, the first data set is restored and ready for use. No actions need to be performed to the first data set prior to use by the application. Thus, the RP may be restartable provided that the RP meets the restartable criteria described elsewhere herein in more detail.

As an example of an RP that is recoverable, the RP may include a first set of data representing data at a first point in time. Changes made with respect to this first set of data up to a second point in time may be stored in the form of logged write transactions. In connection with performing the data restoration to recover data from the second point in time, the first data set is restored along with the transaction log recording changes made from the first point in time to the second point in time with respect to the first set of data. In connection with restoring the application data to the second point in time, additional steps are performed prior to the data set being ready for use by the application. The additional steps may include applying logged write transactions up to the second point in time. Additionally, the first data set may also be rolled forward to a later date by applying additional logged write transactions. Thus, the RP in this example may be recoverable with respect to the RP at the second point in time provided that the RP meets the recoverable criteria described elsewhere herein in more detail.

Figure 10:
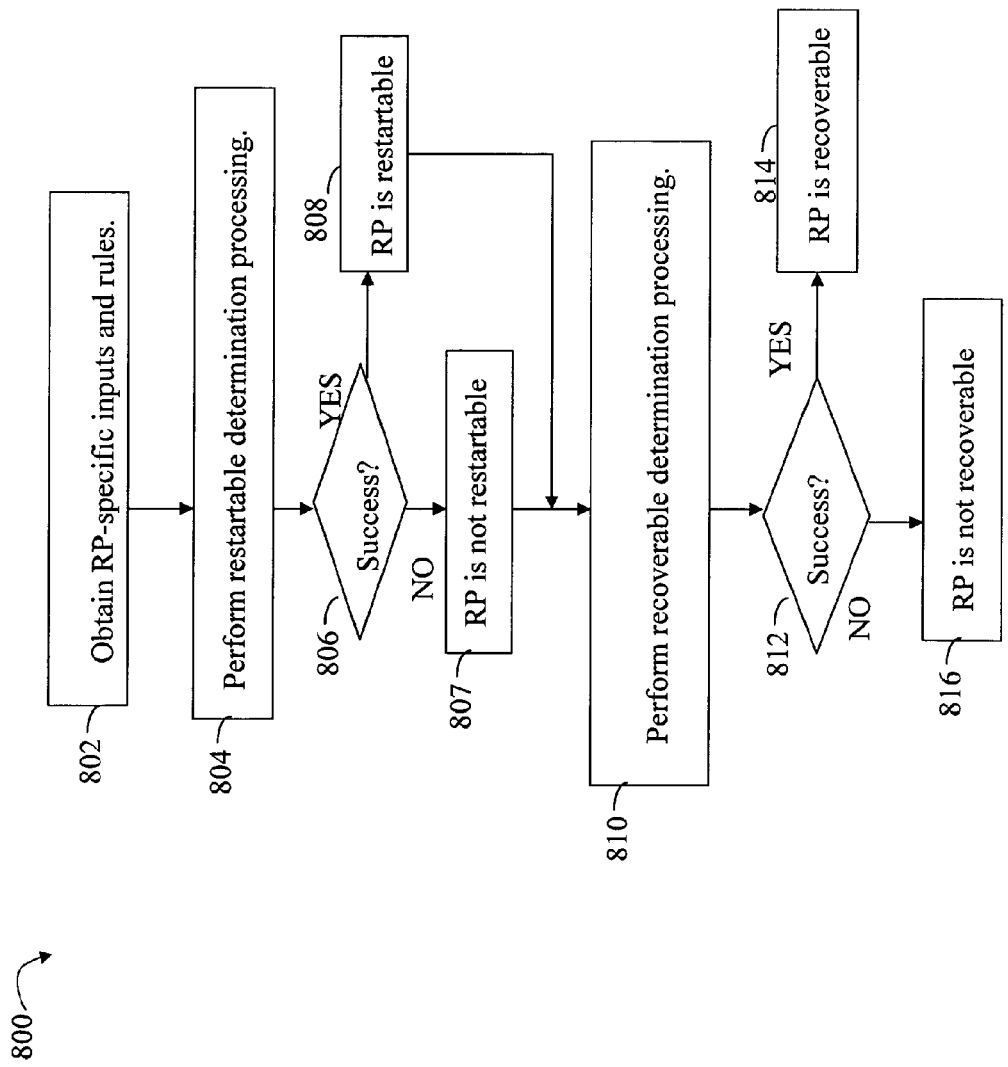
FIG. 10-13 are flowcharts of processing steps that may be performed in an embodiment to determine whether a recovery point is restartable and/or recoverable.

Additionally, a single RP that meets both the recoverable criteria and the restartable criteria described elsewhere herein in more detail, for example, in connection with FIG. 10, is characterized as both recoverable and restartable.

As will be described in more detail in following paragraphs, an embodiment using the techniques herein may collect information, such as from the IRQA Apparatus, and perform analysis to determine whether an RP is restartable and/or recoverable.

Another attribute that may be associated with an RP indicates an RP replication type. In one embodiment, possible replication types may be PIT (point in time), PIT-consistent, or continuous. An RP having a replication type of "PIT" indicates that the RP provides a point in time copy which may be defined as a fully usable copy of a defined collection of data that contains an image of the data as it appeared at a single point in time. The copy is considered to have logically occurred at that point in time although different DP methods may use different techniques in providing the copy.

An RP having a replication type of "PIT consistent" may be defined as a PIT copy which is consistent with respect to writes or modifications made up to a point in time as applied across the entire RP. Thus, an RP which is PIT consistent is an instance of an RP which has dependent write consistency. As an example, consider an application which writes to three different files when a user performs an update or write transaction. Thus, from the user or application perspective, the user write transaction may be characterized as an atomic operation with respect to the three files in that for there to be dependent write consistency for the application data set (e.g., the three files used by the application), writes to each of the three files need to be completed so that the 3 files are synchronized with respect to the processing needed to complete the user write transaction. If, for example, the application should fail to complete the updates necessary to one of the files, the application data set may be deemed not to be dependent write consistent. In an embodiment including the foregoing application, a sequence number or generation number may be written in each of the three files when updates to that file for a single user write transaction are complete. Thus, a determination as to whether the application data set is dependent write consistent may be made by examining the sequence or generation number of each of the three files. If all 3 files have the same sequence number, then the application data set is dependent write consistent, and otherwise, the data set is not dependent write consistent. As will be appreciated by those skilled in the art, the foregoing is only one example of a dependent write consistent data set and how this may be determined in connection with the techniques herein. In connection with the previous exemplary application data set, a PIT consistent RP reflects a state in which all files and other data elements of the application data set are aligned or synchronized with respect to the same application write transaction. Thus, all portions of the RP reflect having applied the updates with respect to a same application write transaction.

An RP may also have a replication type of "continuous" in which the RP is produced as a result of a continuous data protection process or continuous DP method, such as RDF where updates are propagated to the DP storage on a continuous or ongoing basis as the updates are made to the original copy.

What will now be described are processing steps that may be performed in an embodiment to determine a currently implemented DPP.

Figure 3:
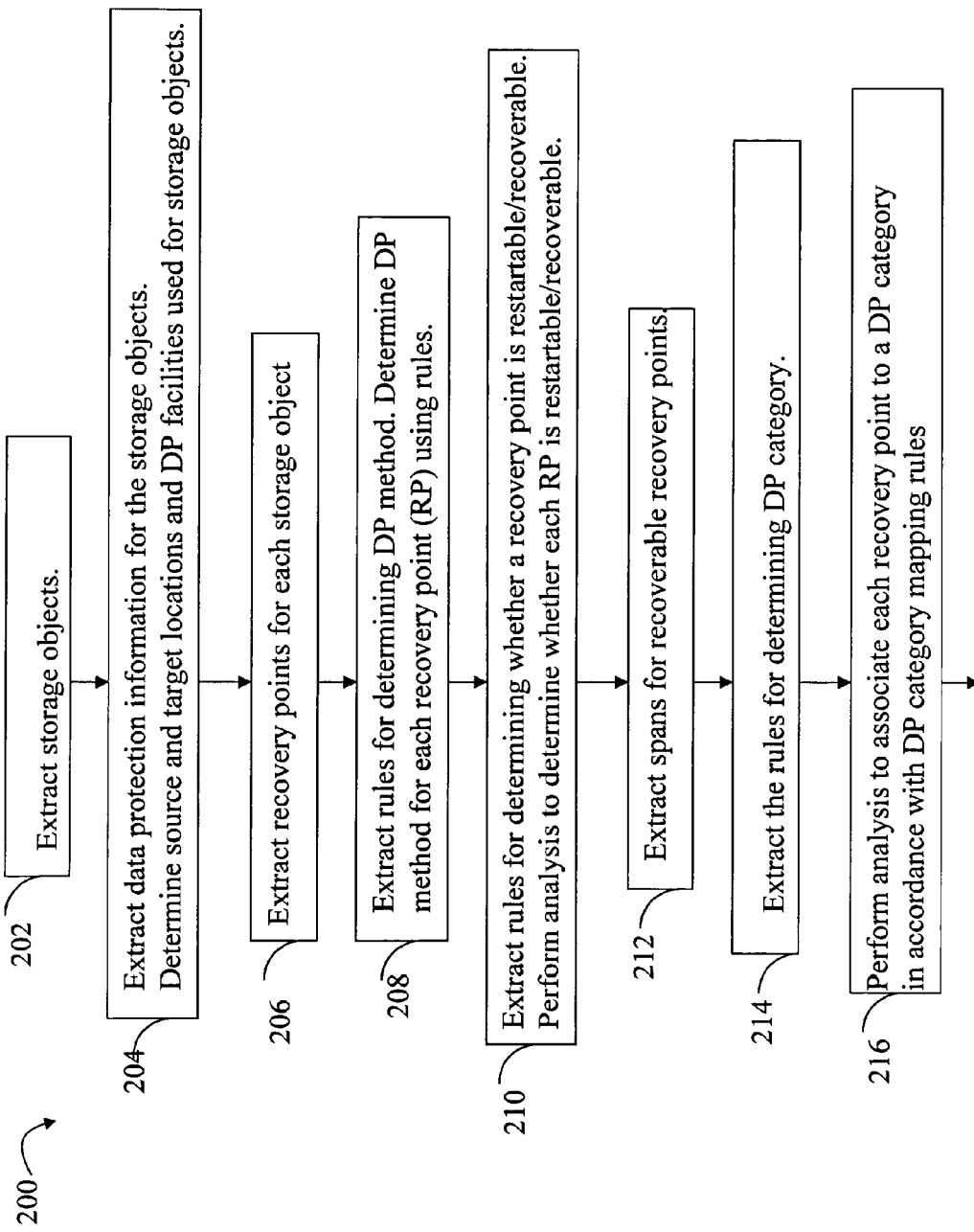
FIGS. 3-4 are flowcharts of processing steps that may be performed in an embodiment to determine an implemented DPP in accordance with the techniques herein.
Figure 4:
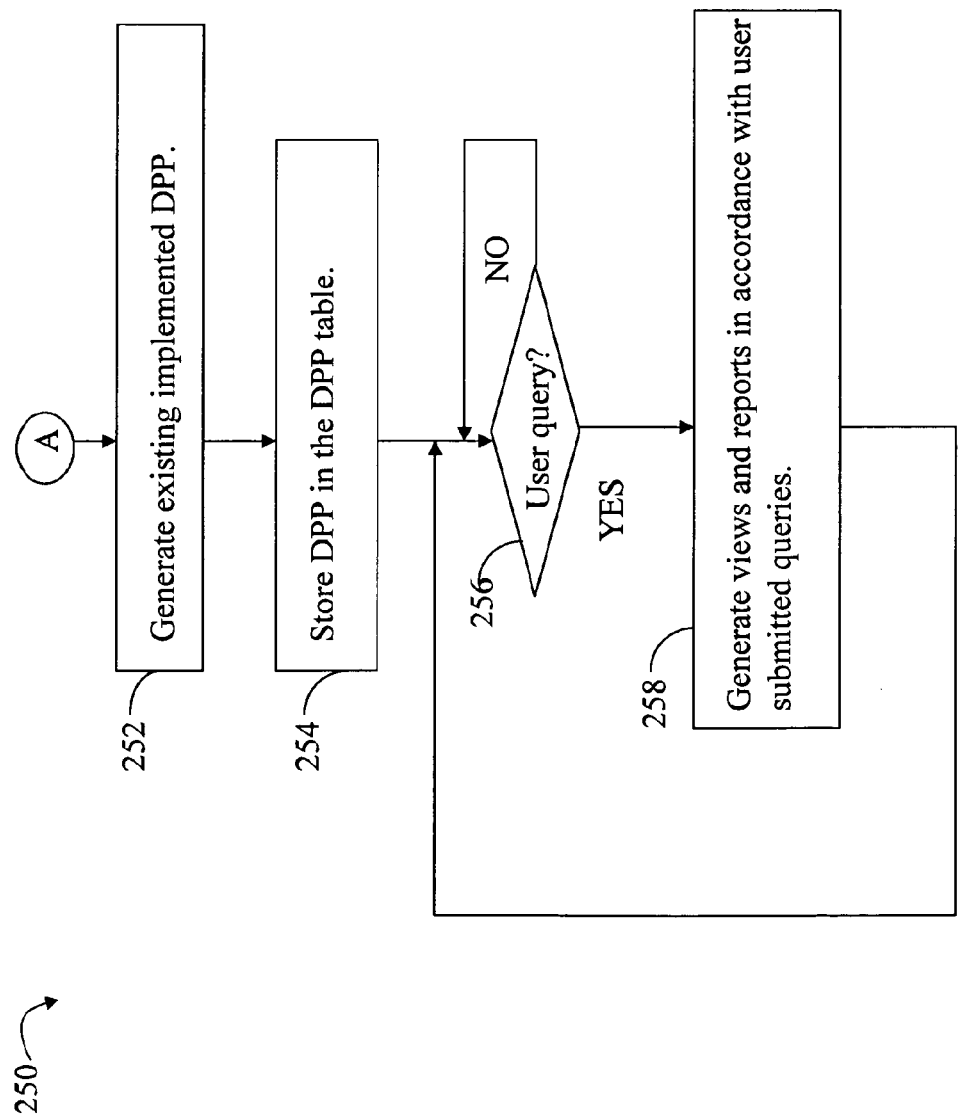

Referring to FIGS. 3 and 4, shown are flowcharts of processing steps that may be performed in an embodiment in connection with determining a currently implemented DPP using the techniques herein. At step 202, the storage objects for which a DPP may be defined are extracted. The storage objects may be determined by communicating with the IRQA Apparatus as described in the '745 application, the DP servers and/or host computers, or other location. At step 204, DP information for the storage objects determined in step 202 is extracted. DP information extracted may generally include information used in subsequent processing steps such as, for example, the source and target locations of files or data elements of each storage object, the DP facilities and DP methods used to provide DP for the storage objects, information used to provide a correlation or pairing of storage objects and copies of the files or data elements on the DP devices (e.g., target location) associated with each storage object, target copy specific information such as when the copy on the DP device was created, the date(s) for which the copy provides data protection, and the like. Information in step 204 may be obtained in a variety of different ways as described in connection with step 202. At step 206, the RPs for each storage object are extracted. Step 206 may include determining which of the copies of the original data stored on the DP devices (e.g. which copies of files, images, and/or other data elements in the DP devices comprise the different RPs. Step 206 may also include associating the different RPs with the appropriate storage objects. The RPs that exist for each storage object may be obtained in a variety of different ways as described in connection with step 202. In one embodiment, the RPs associated with each storage object may be retrieved from the IRQA Apparatus. As described in the '745 application, the IRQA Apparatus may output a set of RPs as may be associated with a storage object such as an application. Using this information and other data, the images associated with each RP may be retrieved from the DP storage devices 12. The '745 application describes how to determine the set of RPs using information collected and may perform recovery logic analysis to validate the ability to recover with images of a particular RP. An embodiment performing the techniques herein may retrieve the set of RPs as determined by the IRQA Apparatus.

In step 208, the rules for determining a DP method associated with each RP may be extracted. In the embodiment described herein, the DP method of an RP may be determined in step 208 by performing analysis of collected information using the foregoing DP method mapping rules. As will be described in more detail elsewhere herein, the DP method may be determined using mapping rules based on, or as a function of, the RP replication type and the particular facility used to create the RP. More generally, determination of the DP method may be expressed as a function F1 where the DP method is determined as an output based on inputs or variables of facility and RP replication type. Thus, F1 may be expressed as:

$$F1(\text{facility}, \text{RP replication type}) = \text{DP method}$$

It should be noted that the RP replication type and facility used to create each RP may be obtained from information stored by the IRQA Apparatus, or other data store or repository accessible for use with the techniques herein. The DP method mapping rules of step 208 may be stored on the computer 102 of FIG. 1 with software performing the processing of FIG. 3, or other location accessible for use with the techniques herein.

In step 210, rules are extracted for determining whether each RP is restartable and/or recoverable. Step 210 then uses those rules to perform analysis and determines whether each RP is restartable and/or recoverable. As will be described in more in following paragraphs and figures, a determination as to whether an RP is restartable and/or recoverable may be made based on: the status of the storage object or application or other entity using the data of the storage object at the time of RP creation, the RP replication type, the storage object or application recovery logic, and a list of additional storage objects that should be protected and included in the RP. As an example regarding the additional storage objects, when performing an incremental backup, an incremental backup log file may be created which indicates the changes for the incremental backup operation with respect to a data set of the DP storage devices associated with a complete or prior full backup operation. Thus, the incremental backup log file generated as part of performing the DP process should also be included in this RP. The status of the storage object (or application or other entity using the data of the storage object) when the data protection processing is performed for creating the RP may be, for example, an indicator as to whether the application was offline or down during the data protection process, in a special mode as may be required when performing the data protection process, in a normal mode (such as when the application is utilizing the data being copied), and the like. The recovery logic may be obtained from the IRQA Apparatus. As described in the '745 application, the recovery logic may describe processing performed in connection with validating the ability to recover using the RP. Processing associated with the recovery logic may include determining whether the RP was created when the application or other entity using the storage object data was in a proper mode, determining whether all data elements of the original data set, such as all files of a file system that are being copied by DP processing, are protected by the RP (e.g., that there were no errors in connection with copying the files to the DP device during DP processing), and the like. As mentioned above the additional storage objects that should be included in the RP may also include another storage object, such as a data file generated as a result of performing the data protection processing. As described in connection with step 208, the rules used to determine whether each RP is restartable and/or recoverable may be stored on the computer 102 of FIG. 1 with software performing the processing of FIG. 3, or other location accessible for use with the techniques herein.

Step 212 is performed for those RPs which are determined in step 210 as being recoverable. Step 212 includes extracting the time spans for each RP based on the log(s) used to roll the RP forward. These logs are one type of log file described herein that may be created as a result of performing a DP process such as an incremental backup made with respect to a previous full data backup. As an example, this step may include identifying the log files used in connection with restoring a data set created by performing an incremental back up where the log file indicates the changes made with respect to a previous full backup copy. The time span may be the date/time range with respect to the data set representing the full backup copy and the log file as may be applied to the full backup copy. Identification of the log files associated with an RP may be determined by obtaining information from the IRQA apparatus, DP server, or other component as described more generally herein.

It should be noted that log files may be used in connection with creating both a recoverable RP at a first point in time and also in rolling the recoverable RP forward in time. A first set of log files may be used, for example, to create an instance of a recoverable RP at a first point in time. Once the recoverable RP is established, log files corresponding to points in time subsequent to the first point in time may optionally be included in an RP and used to roll the recoverable RP forward in time. The first set of log files used to create the recoverable RP at the first point in time may be characterized as required since without these files, there is no RP. This requirement, besides other criteria, are described in more detail in following paragraphs in connection with recoverable determination processing and associated criteria.

In step 214, the mapping rules for determining the DP category for each RP are extracted. The mapping rules of step 214 may be stored in any of a variety of locations as described above in connection with other rules used for other steps, such as steps 208 and 210. At step 216, the mapping rules for determining a data failure or DP category for the RP are used in connection with performing an analysis to associate each RP with a DP category. It should be noted that step 216 applies the mapping rules obtained in step 214 to associate one or more DP categories, for example, one of the 4 categories indicated by column 122 of FIG. 2, with each RP. Thus, the mapping rules for determining a DP category may also be characterized as DP strategy rules which identify a DP strategy, as implemented when creating the RP, for each of the possible categories of DP or data failures. In connection with step 214 and others herein using rules, only a portion of the rules stored in a data base or other data store or repository may be retrieved and/or utilized depending on which rules may be relevant. Application of the mapping rules used to determine the DP or data failure category for an RP may be more generally represented as a function F2 where the output in this particular embodiment is the DP category determined based on three inputs or variables—DP method, RP location, RP type, where DP method is the output of function F1 described above, RP location is as described in connection with column 112 of FIG. 2, and RP type is one of restartable or recoverable as also described elsewhere herein in more detail. Function F2 may be expressed as:

$$F2(DP\ method, RP\ location, RP\ type) = \text{data failure or DP category.}$$

In step 252, the currently implemented DPP may be generated. As described herein in one embodiment, the implemented DPP may include a set of information as illustrated in FIG. 2 with omission of the RTO. In this example, the DPP does not include an RTO value but a DPP can include an RTO and/or other information than as illustrated in FIG. 2. Step 252 may include calculating the RPO and calculating the frequency for each DP category of each storage object. The RPO calculation may be determined as a time difference expressed as:

$$\text{time difference} = (\text{current time} - \text{time associated with the latest/most recent RP})$$

where "time associated with the latest/most recent RP" represents the most recent recovery time provided by all the RPs for a storage object. Determination of RPO may use information for the RPs determined in connection with step 212. As described herein, the frequency represents the frequency at which the data protection process is performed for a given storage object. For example, the frequency may indicate how frequently a file system is backed up (e.g., rate at which an RP is generated as a result of performing a data protection process for RPs included in one DP category for a storage object). It will be appreciated that the frequency calculation representing the actual frequency (as opposed to a frequency determined based on planned or scheduled DP processing times which may not actually occur) can be determined in a variety of different ways. For example, the frequency for a storage object may be based on time information obtained from another type of DP process log files recording a session when the data process was performed, using date/time information stored elsewhere as to when the DP process was commenced, using attributes associated with the RP indicating creation date/time, and the like. The foregoing may indicate when each RP for a storage object is created. The frequency may also be obtained using information included in a DP process schedule indicating when a DP process for a storage object is scheduled. Such information used to calculate the frequency may be obtained, for example, from the IRQA Apparatus.

In step 254, the DPP may be stored in a DPP table or other form for use in connection with subsequent processing steps.

It should be noted that processing of FIGS. 3 and 4 up to and including step 254 may be performed as a first stage at a first point in time. Subsequently, the information stored in step 254 may be used to generate views and reports in accordance with processing of steps 256 and 258. At step 256, a determination may be made as to whether a user query has been entered. If not, control waits at step 256 until step 256 evaluates to yes. At step 258, views and reports are generated in accordance with the user submitted queries. From step 258, processing may return to step 256. It should be noted that processing of steps 256 and 258 are illustrated as a continuous loop to represent the processing as may be performed in connection with obtaining and responding to user submitted queries such as in connection with an interactive user interface. Processing of steps 256-258 may terminate when the user interface is closed.

Described in following paragraphs are examples of different rules used in connection with FIGS. 3 and 4 processing steps, Referring to FIG. 5, shown is an example illustrating a representation of the DP method mapping rules as may be used in connection with step 208 as described above. The example 300 includes the rules in a tabular form in which each rule may correspond to a row of the table 300. Column 302 identifies the facility. Column 304 identifies the RP replication type. Column 306 identifies the DP method. Information in columns 302 and 304 are inputs used to determine the DP method of column 306 as an output for particular value pairs of facility and RP replication type. As indicated in the example 300, DP method mapping rules may exist for different facilities including BCVs (business continuance volumes), Clone (such as by EMC's TimeFinder/Clone), Snap (providing a snapshot), RDF, RDF/PIT, NetBackup, and NetWorker. As different facilities are added or functionality associated with a facility changes, additional DP method mapping rules may added. In an embodiment in which a particular facility is not used, the rules related to that facility may not be retrieved for use with processing of FIG. 3 as described above. The facilities may be provided by one or more vendors. With reference to the example 300, Business Continuance Volumes (BCVs) and data operations used in connection therewith, are described in U.S. Pat. No. 6,101,497, filed on Apr. 25, 1997, which is herein incorporated by reference. RDF and RDF/PIT may refer to different types of data protection that can be provided using RDF functionality. NetBackup, and NetWorker may refer to software applications by one or more vendors used to perform a backup. In the example 300, the RP replication type 304 and exemplary DP methods of 306 including Copy, Snap, Backup, and Continuous are described in more detail elsewhere herein. It should be noted in FIG. 5, the DP method for continuous may be indicated in 306a as "remote", and the DP method for Copy may be indicated in 306b, 306c as "remote". In the context of a DP method, a DP method designated as "remote" may refer to a DP method performed which results in creating a copy of an original data set in a different data storage system, such as a different data storage array, than the data storage system or array that includes the source or original copy. In other words when specifying "remote" for the DP method, the source or original data set is stored on a first data storage system (e.g., such as a first data storage array) and the copy or target created as a result of performing the DP method is stored on a second different data storage system (e.g., such as a second data storage array). The foregoing first and second data storage systems may be located at the same site or physical location. The "remote" aspect refers to the different data storage arrays for the source and target data sets which may be at the same physical site. A DP method in column 306 which is not designated as remote (e.g, as illustrated in every row of table 300 except for 306a, 306b and 306c) indicates that the foregoing first and second data storage systems are the same data storage system, such as the same data storage array.

As new facilities are added, additional DP method mapping rules may be created for use in an embodiment. It should be noted that the particular facilities and other specifics provided herein are examples of what may be included in an embodiment and should not be construed as a limitation of the facilities and other items that may be used in an embodiment in accordance with the techniques described herein.

Referring to FIG. 6, shown is an example illustrating a representation of the DP category mapping rules as may be used in connection with steps 214 and 216 as described above. The example 400 includes the rules in a tabular form in which each rule may correspond to a row of the table 400. Column 402 indicates the DP method. Column 404 indicates the RP location. Column 406 indicates an RP type as one of recoverable or restartable. Column 408 indicates the DP category. Values that may be specified for elements of 402, 404, 406 and 408 are described elsewhere herein in more detail. Values for 402 may be as determined using the rules of FIG. 5. Values for 404 may be one of local or remote indicating the location of the RPs for the storage object. Values for 406 may be based on the determination of RP attributes of restartable and/or recoverable. Values for 408 may be one of the 4 data failure or DP categories. Information in columns 402, 404, and 406 are inputs that may be used in determining a DP category as indicated in column 408.

It should be noted that although a rules-based approach is described herein for determining the DP method and data failure or DP category, it will be appreciated by those skilled in the art that other non-rules-based approaches may be used to implement the techniques herein in an embodiment.

What will now be described is an example of software components that may be used in connection with performing the techniques herein such as performing the processing steps described in connection with the flowcharts of FIGS. 3 and 4.

Figure 7:
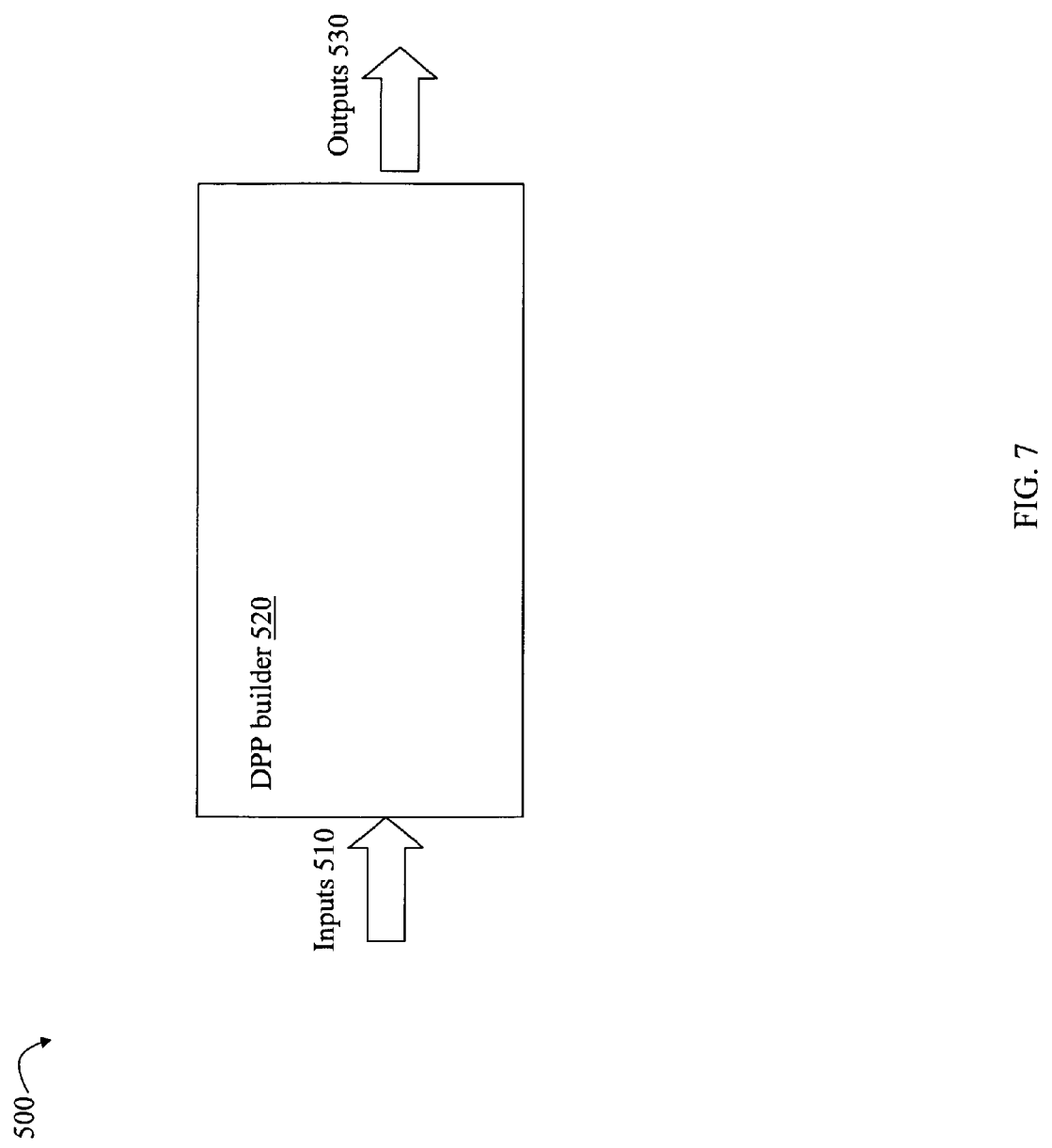
FIGS. 7-9, 14 and 15 are examples illustrating in more detail inputs and outputs that may be used in connection with different components in performing the techniques herein.

Referring to FIG. 7, shown is an example illustrating a representation of DPP builder. The DPP builder 520 may represent the module that performs the processing described herein for determining the currently implemented DPP. The DPP builder 520 takes a variety of different inputs 510 as described elsewhere herein and generates the DPP, as well as views and/or reports regarding the DPP, as outputs 530. As described elsewhere herein, the DPP generated at a first point in time as a first output may also be an input to the DPP builder 520 used to generate a second output at a second later point in time. For example, the currently implemented DPP may be used to generate different views and reports thereof in connection with user queries. As described herein, the inputs and/or outputs may be stored locally, obtained from the IRQA Apparatus, host computers, DP servers and the like. The inputs may include, for example, a list of storage objects, facilities used to create RPs, a list of the RPs and associated DP storage locations, and the like.

Figure 8:
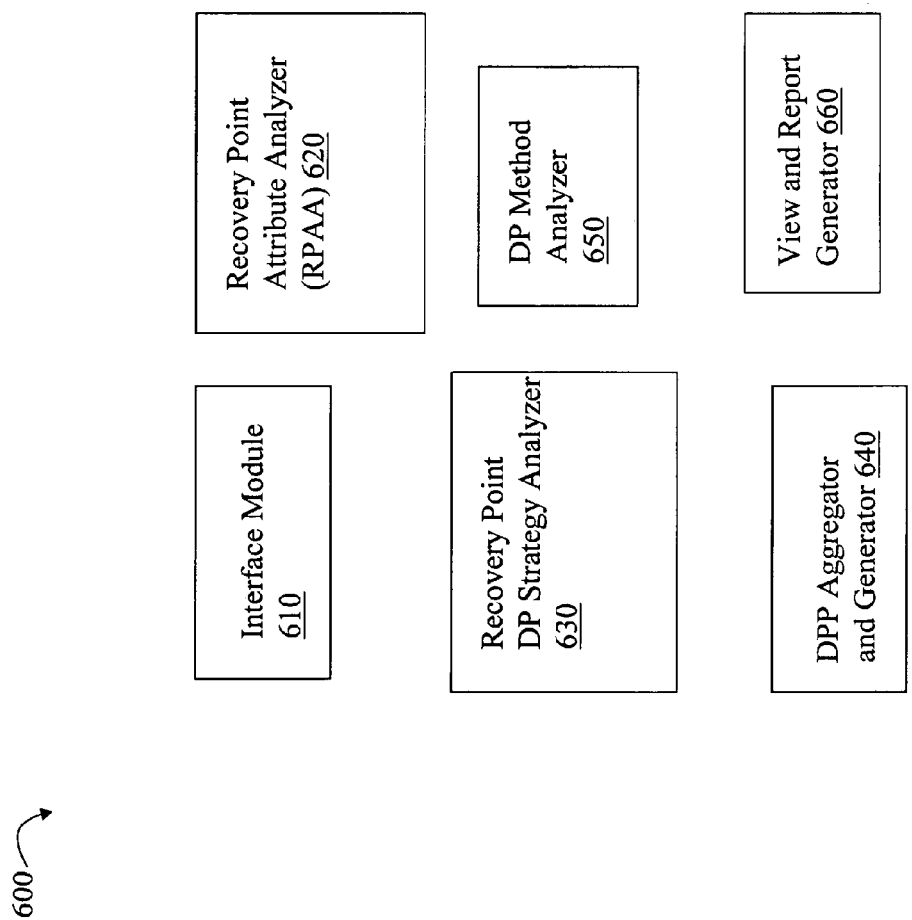

Referring to FIG. 8, shown is an example illustrating a logical representation of functional processing modules that may be included in an embodiment of the DPP builder of FIG. 7. The example 600 includes an interface module 610, a recovery point attribute analyzer (RPAA) 620, a recovery point DP strategy analyzer 630, a DP method analyzer 650, a DPP aggregator and generator 640, and a view and report generator 660. It should be noted that the elements of the example 600 may represent functional components that may correspond to different coded modules included in an embodiment of the DPP builder 520. Interface module 610 may perform processing to obtain information from the IRQA Apparatus or other locations used to determine the currently implemented DPP. The RPAA 620 may perform processing to determine whether an RP is recoverable and/or restartable. The RP DP strategy analyzer 630 may using the mapping rules of FIG. 6 to determine the DP category for each RP. The DP method analyzer 650 may used the mapping rules of FIG. 5 to determine the DP method. The DPP aggregator and generator 640 may aggregate the information received as inputs 510 and also generated as a result of processing performed by other components in connection with generating the DPP. Component 640 may also calculate the frequency and RPO for each DP category of a storage object. The view and report generator 660 may take as an input the DPP generated and stored by 640 at a first point in time, and then perform processing to generate views and reports of the DPP in accordance with user queries.

Figure 9:
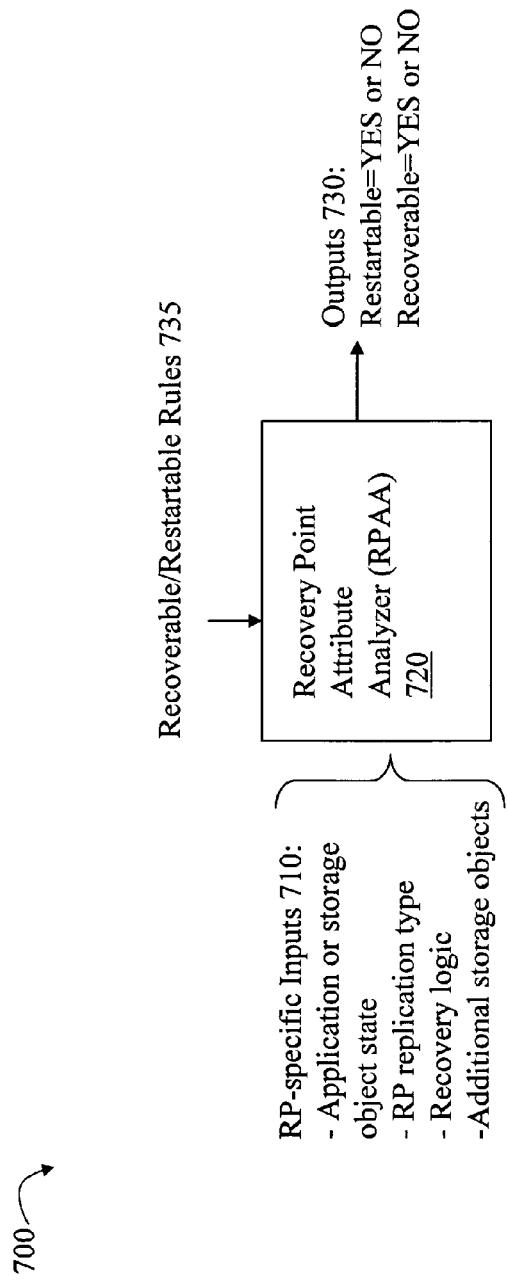

Referring to FIG. 9, shown is an example illustrating the inputs and outputs used by the RPAA in an embodiment performing the techniques herein. The RPAA 720 takes as inputs the recoverable/restartable rules 735 and RP-specific inputs 710 to determine, for each RP as indicated by output 730, a first indicator as to whether the RP is restartable and a second indicator as to whether the RP is recoverable. The rules 735 are described in more detail in following paragraphs and figures. The RP-specific inputs 710 may include the state of the application or storage object when the DP processing was performed to create the RP, the RP replication type, the recovery logic, and a list of additional storage objects. These are generally described above and elsewhere herein in more detail.

What will now be described are processing steps that may be performed by the RPAA to determine whether an RP is recoverable and/or restartable.

Referring to FIG. 10, shown is a flowchart of processing steps that may be performed by the RPAA. At step 802, the RP-specific inputs 710 and restartable/recovery determination rules 735 are obtained. At step 804, restartable determination processing is performed. Step 804 is described in more detail in following paragraphs. At step 806, a determination is made as to whether restartable determination processing of step 804 was successful. If so, control proceeds to step 808 where a determination is made that the RP is restartable and the appropriate indicator may be set as an output. Control then proceeds to step 810. If step 806 evaluates to no, control proceeds to step 807 where a determination is made that the RP is not restartable and the appropriate indicator may be set as an output. Control then proceeds to step 810. At step 810, recoverable determination processing is performed. At step 812, a determination is made as to whether recoverable determination processing of step 810 was successful. If so, control proceeds to step 814 where a determination is made that the RP is recoverable and the appropriate indicator may be set as an output. If step 812 evaluates to no, control proceeds to step 816 where a determination is made that the RP is not recoverable and the appropriate indicator may be set as an output.

Figure 11:
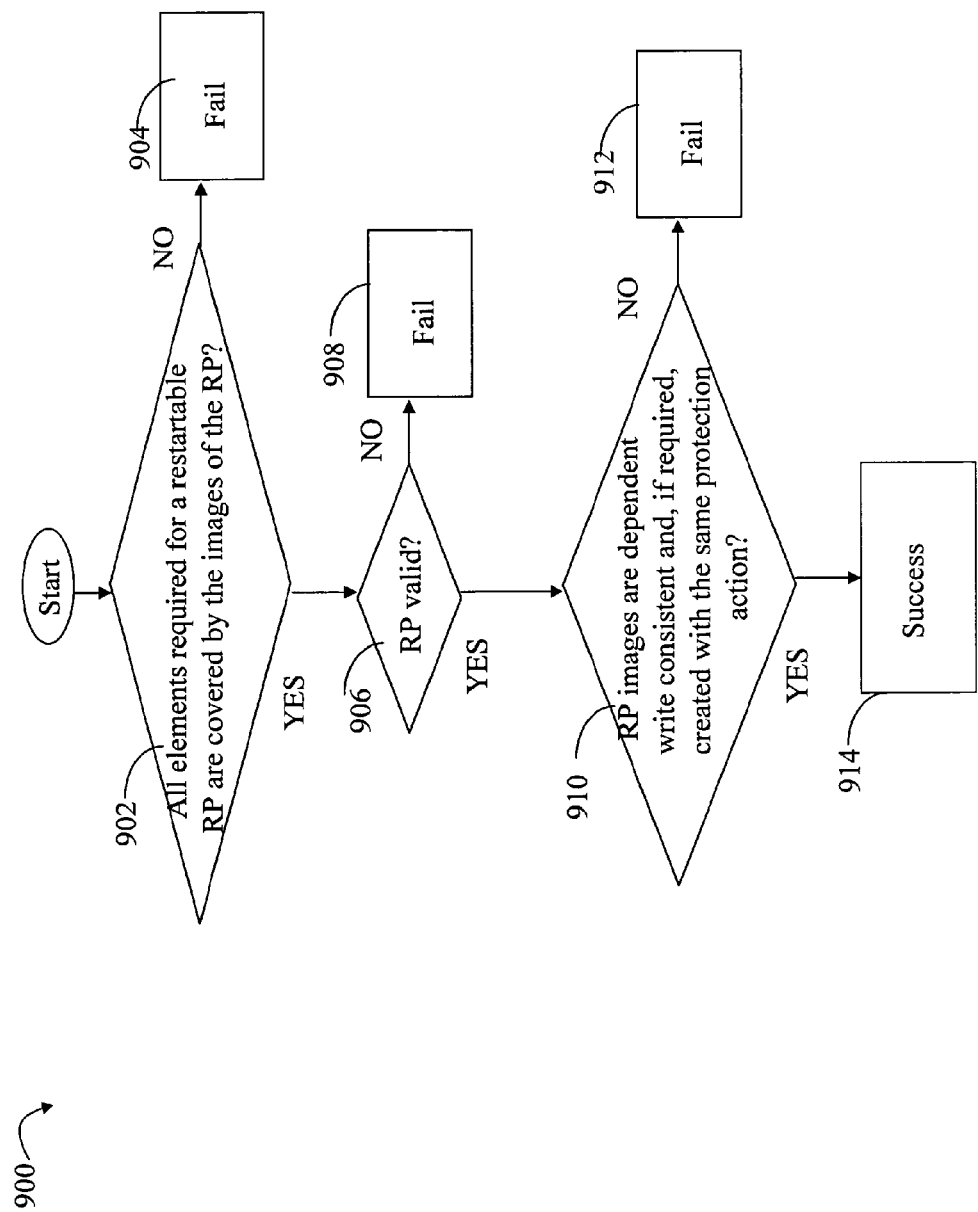

Referring to FIG. 11, shown is a flowchart for performing restartable determination processing. The flowchart 900 includes more detailed processing steps that may be performed in connection with step 804 of FIG. 10. The rules used in connection with performing restartable determination processing may indicate how to determine the following:

restartable rule 1: whether all files or data elements of an RP are dependent write consistent.

restartable rule 2: whether an RP has all required data (e.g., whether all required data is protected by the RP).

restartable rule 3: whether was created when the storage object, or application which utilizes the storage object data, is in a proper state.

It should be noted that each of the above restartable rules may actually be implemented using more than one rule although reference may be made herein to an embodiment in which each of the above restartable rules corresponds to a single rule. In one embodiment, the rules may indicate when each of the above conditions evaluates to true.

In connection with restartable rule 1, dependent write consistency is described elsewhere herein. As an example, an RP replication type of PIT-consistent indicates that the RP is dependent write consistent. It should be noted that dependent write consistency for an RP may also be obtained and determined in other ways than via the PIT consistent RP replication type Restartable rule 1 may indicate how to determine whether the RP is dependent write consistent.

Restartable rule 2 expresses how to determine that necessary data for performing a recovery operation are included in the images. For example, rule 2 may indicate that the RP should contain each file (or otherwise provide protection for each such file) in a file system where the file system is the storage object. Restartable rule 3 may indicate the allowable states that may be associated with the storage object, or application that uses the storage object data. For example, it may be that the application must be in a mode other than a normal processing mode when performing the DP processing. Restartable rule 3 may indicate that the foregoing application should offline or in a special back up mode when performing DP processing.

Referring still to FIG. 11, step 902 performs a determination as to whether all data elements are included in the RP or otherwise protected by the RP. If step 904 evaluates to no, control proceeds to step 904 where it is determined that restartable determination processing has failed. As described herein, a determination of success for restartable processing means that the RP is restartable, and a determination of failure means otherwise. If step 904 evaluates to yes, control proceeds to step 906 where a determination is made as to whether the RP is valid. If step 906 evaluates to no, control proceeds to step 908 where it is determined that restartable determination processing has failed. If step 906 evaluates to yes, control proceeds to step 910 where a determination is made as to whether the images of the RP are dependent write consistent, and, if required, whether the images of the RP were created with the same protection action.

It should be noted that it may or may not be a requirement that all images of an RP be created with the same protection action at a point in time. A protection action may be, for example, a command to replicate data from a device. The recovery logic may indicate whether all images of the RP are required to be created from a same protection action. If so, step 910 may include making sure that this requirement is met. In connection with determining whether the images are created with the same protection action, an embodiment may examine information recorded during creation of the images of an RP to ensure that all such images were created as a result of performing the same DP process initiated at a same point in time. For example, if images of an RP are required to be created with a same protection action as indicated by recovery logic, step 910 may include determining whether a first image and a second image of the RP were created as a result of DP processing initiated at a same time and performed by the same facility.

As an example of when the RP images may not be required to be created from the same protection action, consider an application which writes its data to two devices. The application is down or offline for a time period so that no user can perform transactions using the application and its data. Two commands are issued at different points in time during this time period. At a first point in time during this time period when the application is down, a first command may be issued which replicates the application data included in a first device. At a second later point in time during this same time period while the application is down, a second command may be issued which replicates the application data included in a second device. During the time period that the application is down and the two replication commands to replicate the application data on the two devices are performed, the application is not restarted and no writes are performed to modify the application data. Thus, the recovery logic for this application's data (e.g., on the foregoing two devices) may not require the RP images to be created from the same protection action or command that replicated the application data. Rather, the recovery logic may specify that all the required RP images should be replicated during the time period when the application is down and that the application is not restarted during this time period while the application's data is being replicated as part of data protection processing.

If step 910 evaluates to no, control proceeds to step 912 where it is determined that restartable determination processing has failed. Otherwise, if step 910 evaluates to yes, control proceeds to step 914 where it is determined that restartable determination processing has succeeded.

In connection with performing step 902, processing may be performed to check whether all required data elements are included in the RP. Step 906 may perform additional processing to assess the state of the RP data related to whether the RP can be used to perform recovery. For example, step 906 may check to ensure that no errors were generated at the time the DP processing created the RP. Such an error may indicate that data included in the RP may not be usable.

In connection with performing step 902, an embodiment may use restartable rule 2 to check, for example, whether all files of a file system are covered by the RP. Step 906 may use the recovery logic input and restartable rules 2 and 3. Steps 902 and 906 processing are described in the '745 application and may be performed by the IRQA Apparatus. Step 910 may use the RP replication type and restartable rule 1. Additionally, step 910 may use the recovery logic to determine whether the RP images should be created from the same protection action and, if so, then perform processing to ensure that all RP images meet this requirement and were indeed created from the same protection action.

Figure 12:
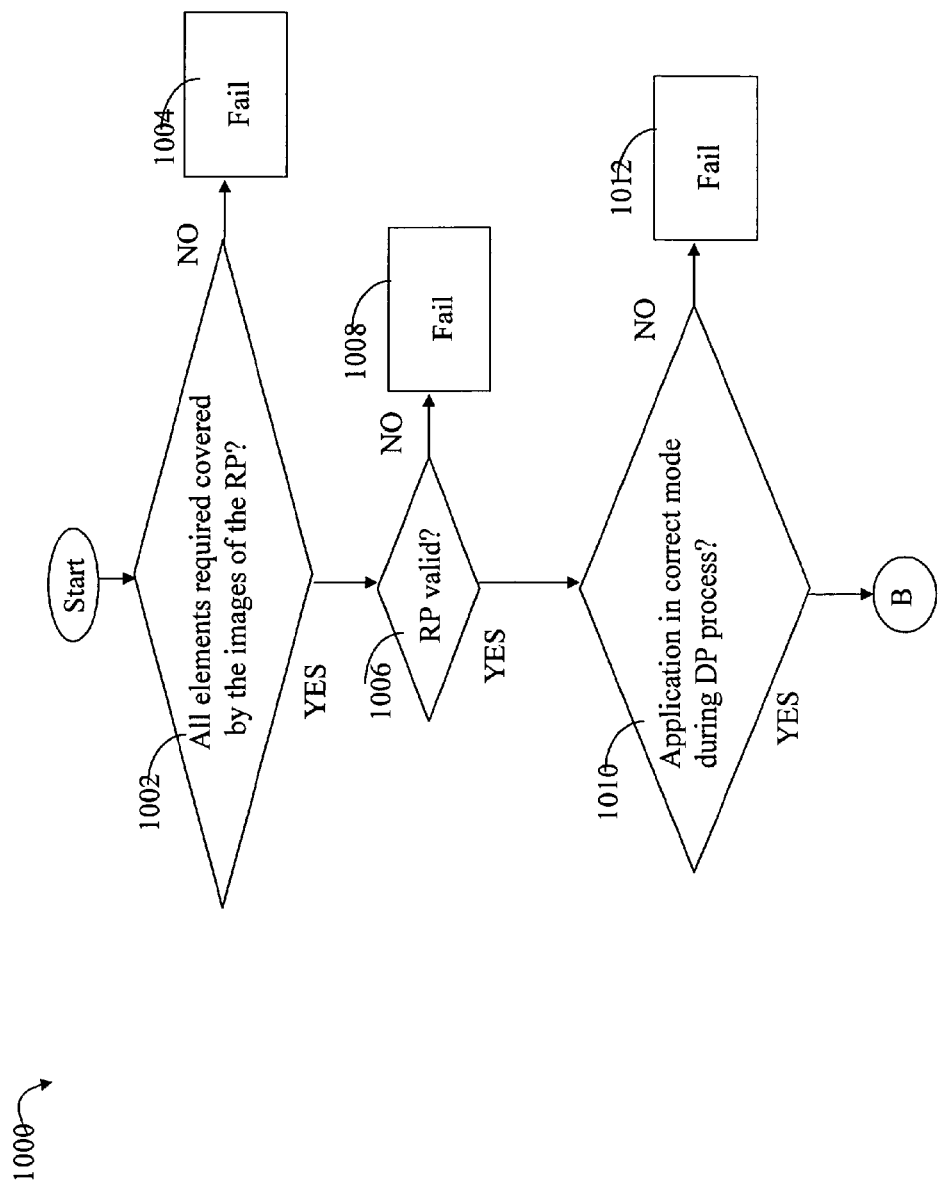
Figure 13:
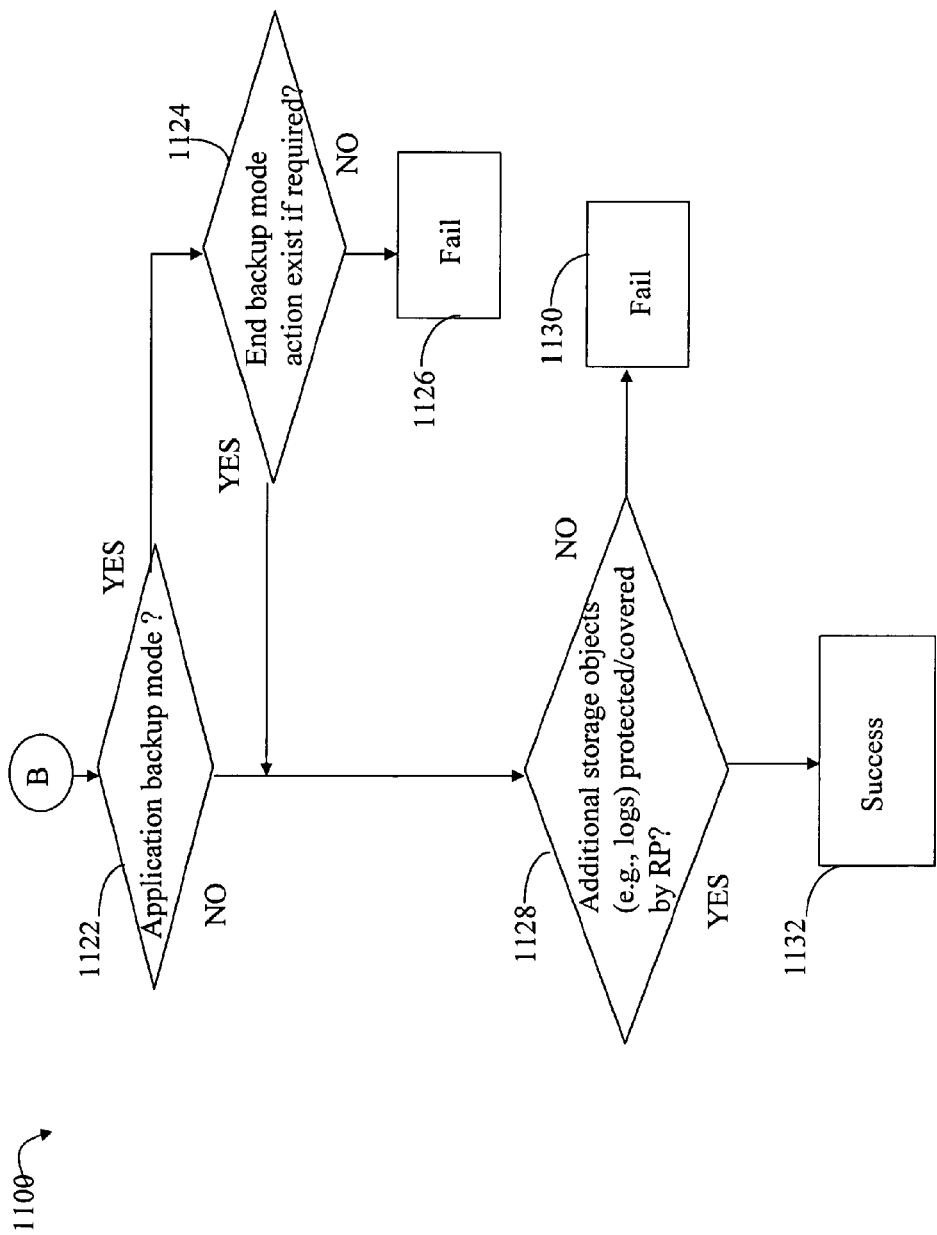

Referring to FIG. 12, shown is a flowchart for performing recoverable determination processing. The flowchart 1000 includes more detailed processing steps that may be performed in connection with step 810 of FIG. 10.

In following description, reference is made to begin and end backup mode actions which place an application accessing a data set, respectively, in and out of a special backup mode or processing state. In order to have a recoverable RP, an application may be required to be in a special mode or state when performing DP processing where an original copy of the application's data set at a source location is copied to a target location on one or more DP devices. For such an application, the begin backup mode action corresponds to the command or other action performed to place the application in this special mode prior to performing DP processing on the application's data set. Similarly, the end backup mode action corresponds to the command or other action performed to take the application out of this special mode and return the application to a normal processing state. In connection with recoverable determination processing described below, an embodiment may make a determination as to whether the appropriate steps were successfully taken in connection with the begin and end backup mode actions by examining information, for example, from a database, event log, and the like, where a record may be kept as to what actions are taken in connection with performing DP processing. Also using the database, event log, and the like, a determination can be made as to whether, once the application was placed in the special backup mode, an end backup mode action was successfully performed.

It should be noted that the application may not be required to be in a special mode when DP processing is performed. However, in order for an RP to be recoverable, the application may be required to be in a special mode while performing DP processing creating that RP. As such, processing described below may be used in connection with determining whether the RP is recoverable depending on whether the application was in the proper mode as required for creating a recoverable RP. As described herein, the application may be characterized as being in one of the following states or modes: a special backup mode, normal processing mode (such as when in use for its intended purpose and operation), or down or offline mode (such as when the application is not in use). Besides the application being in one of the foregoing states or modes, reference may also be made herein that the application, or storage object corresponding to the data set used by the application, is in one of the foregoing states or modes.

When an application is placed in the special backup mode with a begin backup mode action at a first point in time, DP processing may be performed to copy the files on the source device needed to recover an original application data set at this first point in time to the target location on the DP device. However, while the application is in the special backup mode, the application may still process user requests which modify the original application data set. Modifications made to the application data set while the application is in the special back up mode (e.g., from begin backup mode action to end backup mode action) may be recorded in a write transaction or log file. One or more log files which record the modifications made to the original application data set while the application is in the special backup mode may also be stored on a DP device as additional storage objects. In order to recover the application data set to the time period indicated by the end backup mode action, the one or more log files recording modifications made while the application was in the special backup mode are needed in addition to the files used to recover the application data at the first point in time. In connection with the recoverable rules and processing described in following paragraphs, the additional log files recording any modification from the time period of the begin backup action mode to the end backup mode action are also needed to obtain the recoverable RP and should be included in (e.g., protected by) the recoverable RP. The foregoing additional log files and the fact that they should exist for the time period between the begin and end backup mode actions is specified in connection with recoverable rule 4 and related processing steps described below. Thus, the required set of log files used to obtain a recoverable RP may include log files starting at some point prior to the begin backup mode action up until the end backup mode action. Additional log files subsequent to the end backup mode action time may be optional used to further roll the recoverable RP forward in time. It should be noted that if the application is down or offline when the DP process is performed, all files needed to recreate the application data set will be copied by the DP process and no further modifications can be made to the application data set while the DP process is being performed since the application is offline.

As described herein, a determination of failure for recoverable means that the RP is not, recoverable.

The rules used in connection with performing recoverable determination processing may indicate how to determine the following:

recoverable rule 1: whether the storage object, or entity using the data thereof, should be in a backup mode during the DP process creating the RP.

recoverable rule 2: whether an RP has all required data (e.g., whether all required data is protected by the RP).

recoverable rule 3: if the storage object as indicated by rule 1 is to be in a backup mode, then:
    a. During DP processing, was the storage object in a state of down or offline? If so, then stop current rule 3.
    b. During DP processing, was the storage object in backup mode? If so then ensure that an end backup mode action exists if the end back up mode action is needed or required.

recoverable rule 4: whether the extra storage objects exist from begin backup mode to end backup mode action.

In connection with the above recoverable rules, a backup mode action of "begin" and "end" may represent, respectively, commands or actions to put the application or its components (e.g., such as the application data set comprising the RP) in a special mode during the DP process and to then transition the application from the special mode to a normal processing mode after DP processing is complete. The special mode represents a special application state that the application may be in when performing DP processing. In connection with a recoverable RP as will be described below, processing may be performed to ensure that storage objects, such as incremental log files, created as a result of the DP process during the begin time associated with the begin backup mode action and the end time associated with the end backup mode action are protected in the RP.

It should be noted that each of the above recoverable rules may actually be implemented using more than one rule although reference may be made herein to an embodiment in which each of the above recoverable rules corresponds to a single rule. In one embodiment, the rules may indicate when each of the above conditions evaluates to true.

Referring to FIG. 12, step 1002 performs a determination as to whether all data elements are included in the RP or otherwise protected by the RP. If step 1002 evaluates to no, control proceeds to step 1004 where it is determined that recoverable determination processing has failed. As described herein, a determination of success for recoverable processing means that the RP is recoverable, and a determination of failure means otherwise. If step 1002 evaluates to yes, control proceeds to step 1006 where a determination is made as to whether the RP is valid. If step 1006 evaluates to no, control proceeds to step 1008 where it is determined that recoverable determination processing has failed. If step 1006 evaluates to yes, control proceeds to step 1010 where a determination is made as to whether the application or storage object was in a proper mode or state during DP processing when the RP was created. If step 1010 evaluates to no, control proceeds to step 1012 where it is determined that recoverable determination processing has failed. Otherwise, if step 1010 evaluates to yes, control proceeds to step 1122 where it is determined whether the application or storage object should have been in backup mode at the time the DP processing was performed. If step 1122 evaluates to no, control proceeds to step 1128. If step 1122 evaluates to yes, control proceeds to step 1124 where a determination is made as to whether an end backup mode action exists if such end back up mode action is needed or required. As described elsewhere, a set of recovery logic may be defined for recovering a storage object such as application data. Such recovery logic may vary with application and storage object. The recovery logic, for example, for an application which is in a special backup mode when the application's data is being replicated as part of a data protection process may or may not require an end backup mode action. The recovery logic may indicate whether the end backup command is required or needed. If the recovery logic for the storage object (e.g. the application's data) indicates that the end backup mode action is required, step 1124 may perform processing to verify that this required end backup mode action exists for the RPs of the storage object. If step 1124 evaluates to no, control proceeds to step 1126 where a determination is made that recoverable determination processing has failed. Otherwise, if step 1124 evaluates to yes, control proceeds to step 1128. At step 1128, a determination is made as to whether the additional storage objects created during the begin backup mode and end backup mode actions are protected by the RP. If step 1128 evaluates to no, control proceeds to step 1130 where a determination is made that the recoverable determination processing has failed. Otherwise, if step 1128 evaluates to yes, control proceeds to step 1132 where a determination is made that recoverable determination processing has succeeded.

It should be noted that steps 1002 and 1006, are similar, respectively, to steps 902 and 906 as described in connection with FIG. 11 although different files or other data elements may be used in connection with each type of RP processing. Step 1010 may use the recoverable rule 1 and the input indicating the state of the storage object, or entity that uses the data thereof, at the time the DP process was performed that created the RP. Step 1122 may also use the input indicating the state of the storage object, or entity that uses the data thereof, at the time the DP process was performed that created the RP. Step 1124 may use recoverable rule 3 and session logs or other entities recording the DP process. Step 1128 may use the list of additional storage objects, recoverable rule 4, and the timestamps corresponding to the actions, such as commands, that transitioned the storage object (or entity such as an application accessing the storage object data) in and out of backup mode.

Figure 14:
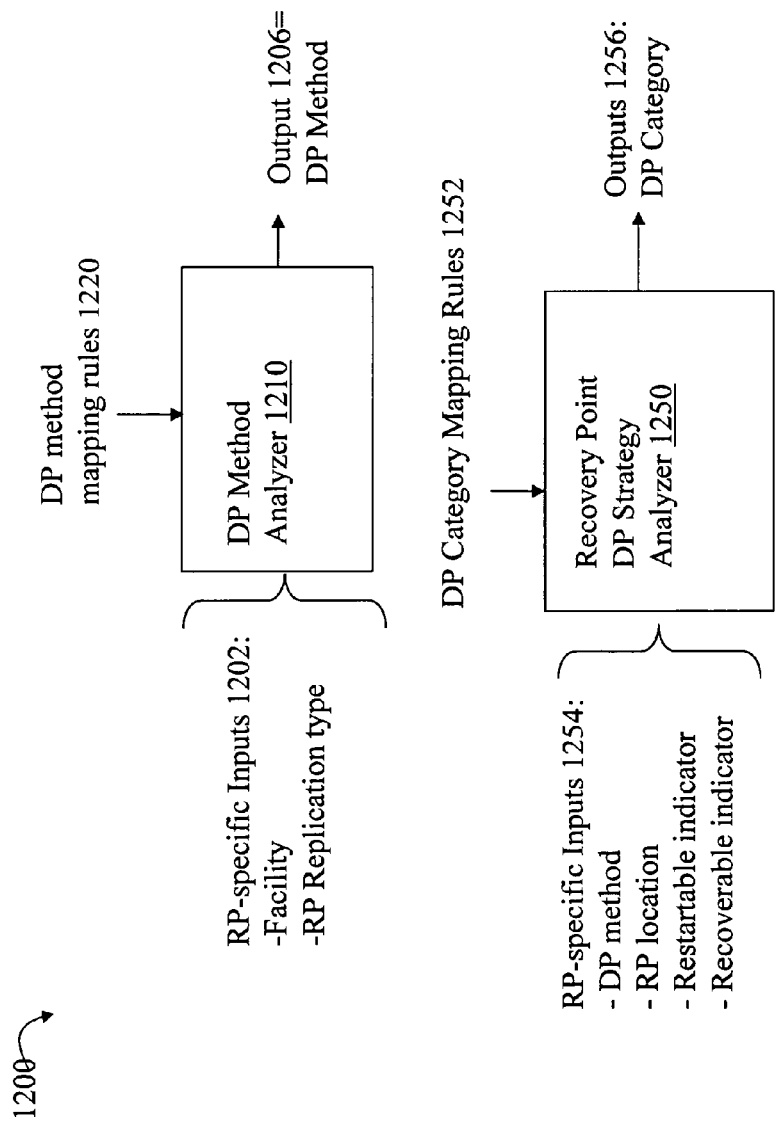

Referring to FIG. 14, shown is an example illustrating inputs and outputs as may be used by the DP method analyzer and recovery point DP strategy analyzer in an embodiment. In the example 1200, the DP method analyzer 1210 may use as inputs the DP method mapping rules 1220 and RP-specific inputs 1202. The inputs 1202 may include the facility and RP replication type associated with RP being analyzed. The input 1220 may be the rules, or a portion thereof, as illustrated in FIG. 5. Analyzer 1210 determines the DP method as output 1206. The recovery point DP strategy analyzer 1250 may use as inputs the DP category mapping rules 1252 and RP-specific inputs 1254. The inputs 1254 may include the DP method (as determined by 1210), the RP location, a restartable indicator, and a recoverable indicator. The restartable and recoverable indicators may indicate, respectively, whether an RP is restartable and recoverable. The foregoing indicators may be generated as outputs of the RPAA 720 as described above. The input 1252 may be the rules, or a portion thereof, as illustrated in FIG. 6. Analyzer 1250 determines the DP category as output 1256. As described elsewhere herein, for an RP mapped to a selected DP category, the attributes of the RP represent the data protection strategy for providing data protection for the incidents or events of the selected DP category. Such attributes associated with the RP may include, for example, the DP method used to create the RP, RPO, RP location, and other information as may be included in a row of the table of FIG. 2 for an implemented DPP.

Figure 15:
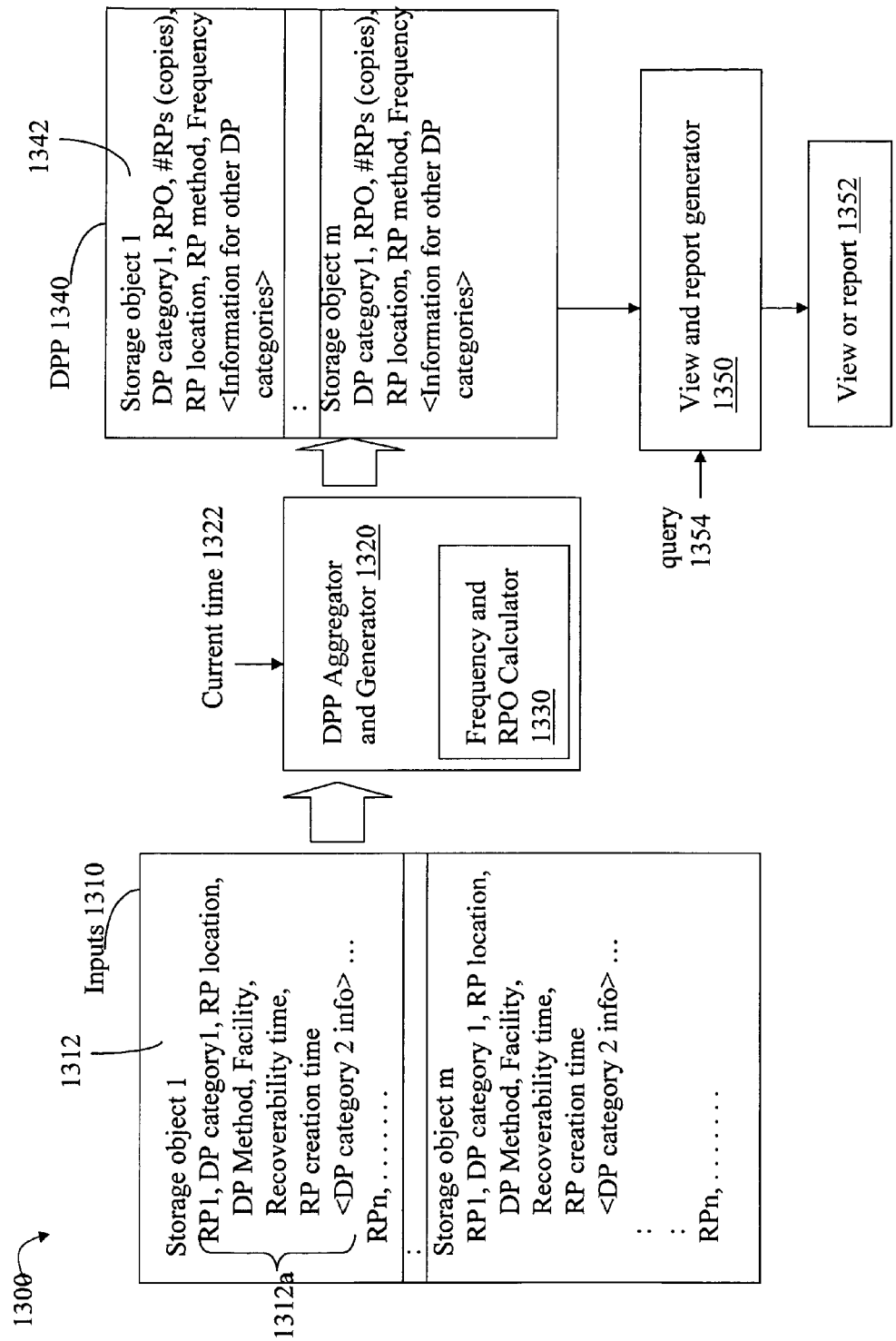

Referring to FIG. 15, shown is an example illustrating inputs and outputs as may be used by the DPP aggregator and generator 1320 and view and report generator 1350 as may be included in an embodiment performing the techniques herein. The DPP aggregator and generator 1320 may takes as inputs the current time 1322, and inputs 1310 and generate as an output the DPP 1340. The module 1320 may include a frequency and RPO calculator 1330 which calculates the frequency and RPO for each DP category associated with a storage object. The inputs 1310 may collectively represent information for each storage object, and each RP for a given storage object. Although the inputs 1310 are illustrated as having a particular structure, it should be noted that module 1320 may receive the information 1310 in any form, format or structure suitable for use by 1320. The module 1320 may actually perform processing to organize the information of 1310 rather than receive 1310 in a structured form as illustrated. The information in 1310 may include a record 1312 for each storage object. The record 1312 may include a portion 1312a for each RP of the storage object. The information in 1312a may include, for example, the DP category as determined by module 1250 of FIG. 14, the DP method as determined by module 1210 of FIG. 14, various RP attributes such as the RP location and facility as described in connection with FIGS. 5 and 6, a recoverability time, and RP creation time. The recoverability time may represent an initial point in time and a subsequent span of time for which the RP provides recoverability of data for the associated storage object.

The recoverability time associated with each RP may be used in determining the actual RPO for a particular DP category of an implemented DPP. The RPO for a DP category of a storage object in which one or more RPs are mapped to the DP category may be expressed as:

RPO(storage object,DP category,set of RPs)=current time−(MAX(recoverability time for all RPs in the set of RPs)

where MAX determines the latest or most recent date/time.

The RP creation time may represent the time at which the RP was created or time at which the DP process causing generation of the RP was initiated. An embodiment may determine frequency in a variety of different ways. An embodiment may determine the frequency based on a DP schedule or plan specifying when a DP process is performed for a given storage object. Rather than determine the frequency based on planned times, the frequency may be determined as an actual frequency using date/time information associated with when each RP was actually created, or in other words, when the DP process resulting in creation of the RP occurred. Such data/time information may be obtained using attribute information associated with each RP, for example, as may be derived using session logs recorded when the scheduled DP processing actually occurred. In this latter case, an embodiment may use information such as the RP creation time to determine the frequency at which an RP is created for a given time period. The actual frequency may be calculated using information obtained in a variety of different ways and may be determined, for example, by counting a number of RPs created during a time period or time interval.

The DPP 1340 represents information than may be collected, calculated and associated with each storage object for a DPP 1340. The DPP 1340 may be stored, for example, in a DPP table as described elsewhere herein The DPP 1340 may include a record 1342 of DPP information for each storage object. The information in 1340 may be used to generate views and reports in response to user queries. Thus, the DPP 1340 may be used as input to the view and report generator 1350 to generate the desired view or report 1352 in accordance with a user query 1354 input to the generator 1350.

In connection with the various modules illustrated herein as comprising the DPP builder, each module may use different inputs and/or generate other outputs than as described for purposes of example illustrating the techniques herein. For example, the input 1310 and DPP 1340 may also include other information than as illustrated in FIG. 15.

Figure 16:
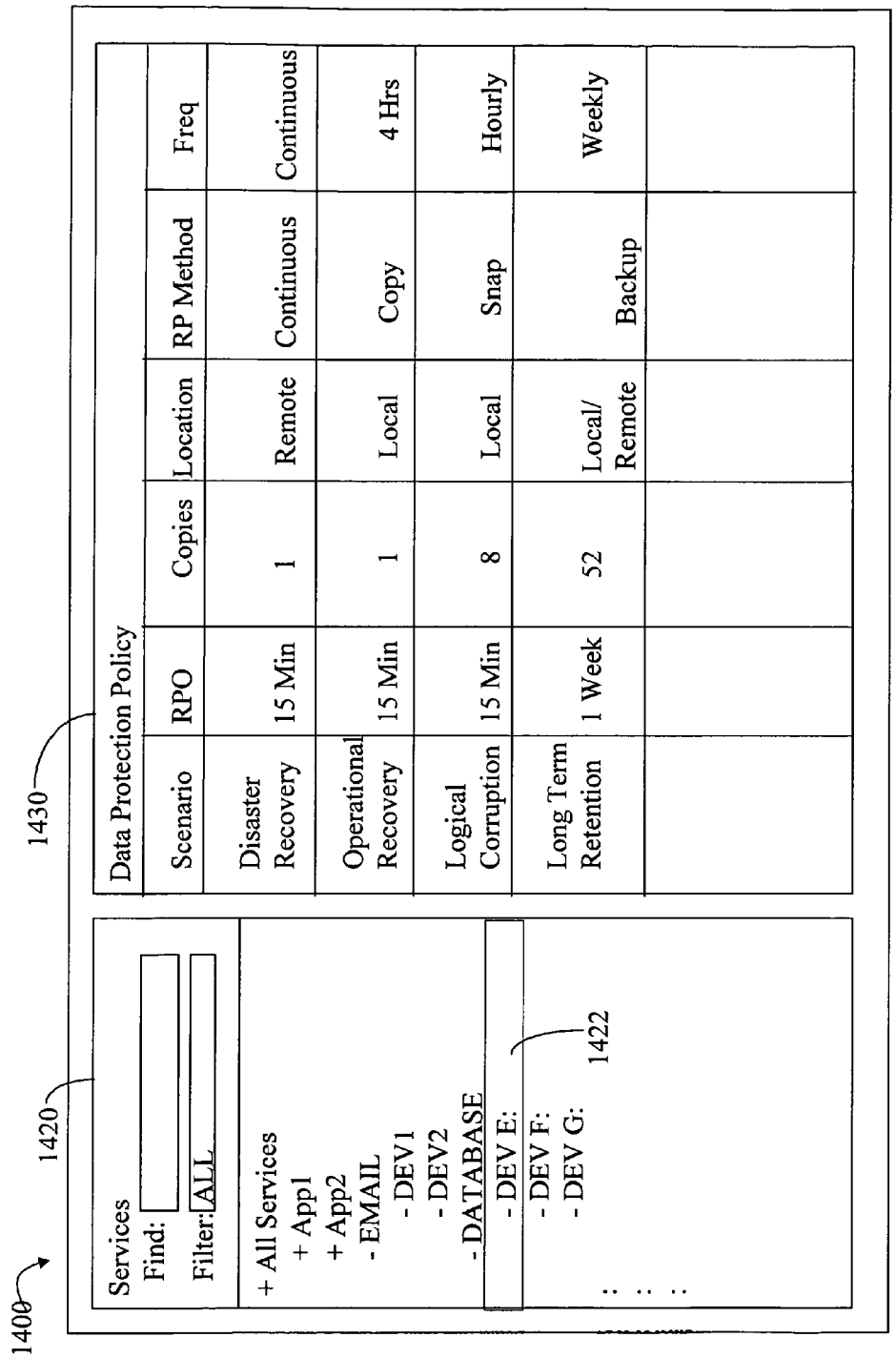
FIG. 16 is an example illustrating information that may be displayed in connection with a user interface in an embodiment using the techniques herein.

Referring to FIG. 16, shown is an example of information than may be included in a user interface display for use in performing the techniques herein in an embodiment. The example 1400 includes a left side 1420 that may be used to make selections. The portion 1420 may list one or more services, such as may be provided by different applications. For each such application, one or more devices including data used by the application may also be optionally displayed. In the example 1420, services may be provided by App1, App2, EMAIL (an email application), and DATABASE (a database application). A selection has been made to expand the information included in 1420 for the EMAIL and DATABASE applications so that the different devices used by each are also included in the display. A user has then made a selection 1422 requesting to display DPP information for DEV E: as used by the DATABASE application. The foregoing selection illustrated by 1422 may correspond to submission of a user query as described above, for example, in connection with steps 256 and 258 of FIG. 4. In response, to the selection 1422, processing may be performed to generate the view as illustrated by 1430. In this example and as also described herein, the DPP information of 1430 does not include an RTO value but a DPP can include RPOs, RTOs and/or other information than as illustrated.

The view provided and illustrated in 1400 may be characterized as a policy-centric view of an implemented or configured DPP.

In connection with determining an implemented DPP as described above, an embodiment may perform processing to determine whether an RP is restartable and/or recoverable. As also described above, a restartable RP may be characterized as an RP for which no user-driven intervention may be needed after restoring the images for the RP in order to recover the storage-object. In other words, the restored images of the restartable RP for a storage object are in a normal working state without requiring additional processing. For example, restoring a database from a restartable RP will automatically bring the database into a transaction consistent state in which the database is ready for use. For a restartable RP, there is not an option to roll-forward to a later point in time. A recoverable RP may be characterized as an RP for which an action is needed after restoring the RP in order to recover the storage-object and place the data of the storage object in a state in which the data is ready for use. A recoverable RP may be optionally rolled forward to a later time, for example, using log files recording modifications to the RP with respect to a base time of the RP. A recoverable RP having a base time may be rolled forward until a break or gap in time occurs with respect to recorded modifications in the log files.

Processing for determining whether an RP is restartable and/or recoverable is described, for example, in connection with step 210 of FIG. 3, element 620 of FIG. 8, FIGS. 9, 10, 11, 12, and 13. The RP attributes of restartable and recoverable may be used, for example, in combination with other RP attributes as illustrated in FIG. 6 to determine a DP category for an RP. What will now be described are other ways in which the RP attributes of restartable and recoverable may be utilized. Processing in following paragraphs may be performed subsequent to determining whether one or more RPs are restartable and/or recoverable as described above. For example, processing described below may utilize boolean results represented by output 730 of FIG. 9 indicating whether the RPAA 720 has determined an RP as recoverable and/or restartable. An embodiment may compute these boolean results prior to performing processing described below. Alternatively, an embodiment may calculate the boolean results as needed in connection with processing steps described below.

Figure 17:
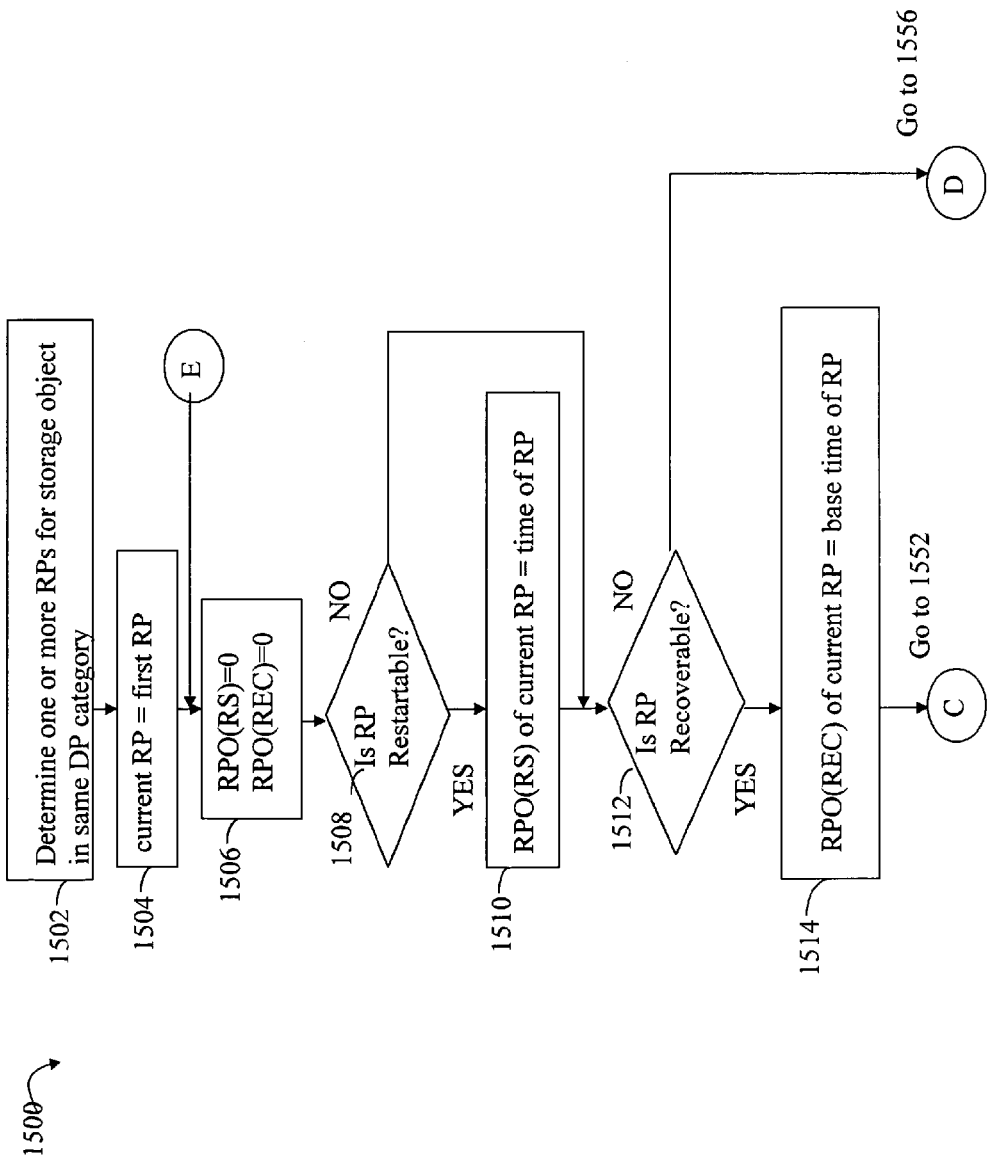
FIGS. 17-18 are flowcharts of processing steps that may be performed in an embodiment for performing an RPO (recovery point objective) calculation.
Figure 18:
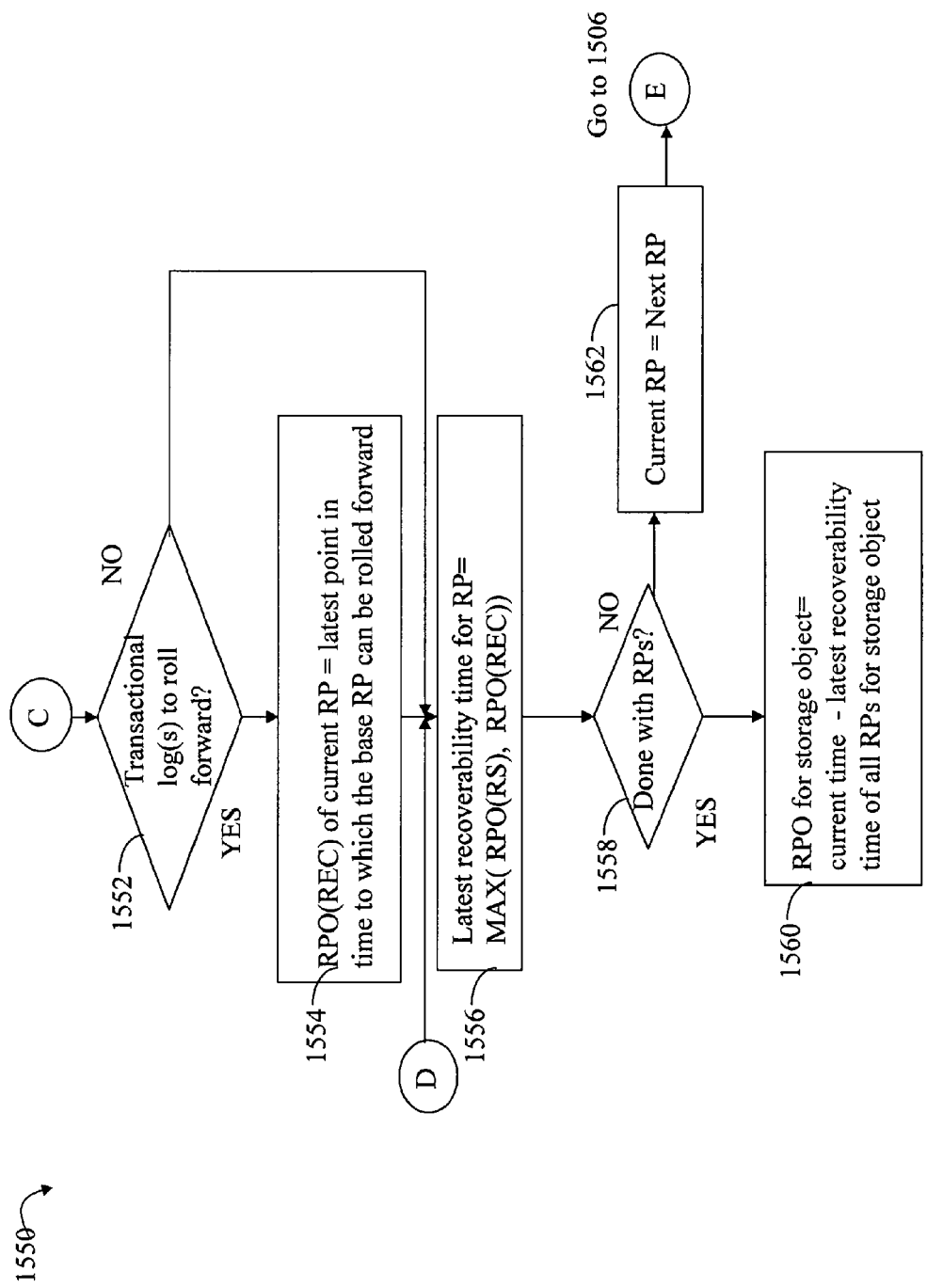

Referring to FIGS. 17 and 18, shown are flowcharts of processing steps that may be performed in an embodiment in connection with performing an RPO calculation in an embodiment in accordance with techniques herein. The steps of FIGS. 17 and 18 may be performed to determine the actual RPO value, for example, for each DP category for a storage object included in an implemented DPP as illustrated in FIG. 16.

A general representation of an actual RPO calculation is described above. Described in following paragraphs is how the RPO calculation may be performed in an embodiment using the restartable and recoverable attributes for an RP. The steps of FIGS. 17 and 18 are written generally for the possibility that an RP can be restartable and/or recoverable. The flowcharts of FIGS. 17 and 18 iterate through each RP in a set of one or more RPs for a storage object. For each RP in the set, the latest recoverability time is determined corresponding to the latest or most recent point in time to which the RP can be used to restore data for the storage object. The latest recoverability time for the storage object may be determined based on which RP in the set has the latest or most recent recoverability time.

At step 1502, a set of one or more RPs in a same DP category for a storage object may be determined. For example, one or more RPs for a same storage object may be determined where the one or more RPs have the same DP category 408 of FIG. 6. At step 1504, a variable current RP is assigned the first RP in the set. At step 1506, two variables, RPO(RS) and RPO(REC), are initialized to 0. The foregoing two variables are used in describing the processing that may be performed in an embodiment. RPO(RS) may represent the recoverability time associated with a restartable RP indicating the point in time at which data can be recovered from the RP. RP(REC) may represent the one or more possible recoverability times associated with a recoverable RP. In connection with recoverable RPs, the recoverability time(s) may include an initial point in time or base time and other points in time included in an optional subsequent span of time when the recoverable RP can be rolled forward to a later date (e.g., data can be recovered using the RP at a later point in time when the RP is rolled forward). At step 1508, a determination is made as to whether the RP is restartable. If so, control proceeds to step 1510 where the variable RPO(RS) for the current RP is assigned the recoverability time of the RP. As described above, a restartable RP does not have an option to roll forward so the point in time to which data can be restored may be represented as a single point in time. From step 1510, control proceeds to step 1512. If step 1508 evaluates to no, control proceeds directly to step 1512.

At step 1512, a determination is made as to whether the RP is recoverable. If so, control proceeds to step 1514 where the variable RPO(REC) for the current RP is assigned to be the initial or base time of the RP. From step 1514, control proceeds to step 1552 where a determination is made as to whether there are one or more transactional logs for the RP. As described elsewhere herein, the one or more transactional logs for the RP may be used in connection with rolling the RP forward to one or more later points in time. The transactional log may record, for example, subsequent modifications with respect to the RP at the initial or base point in time. Thus, application of subsequent modifications (as obtained from the transaction log) to the base point RP may be performed to roll the RP forward and reflect the state of the RP at a later point in time. If step 1552 evaluates to yes indicating that the recoverable RP can be rolled forward, control proceeds to step 1554 where the variable RP(REC) is updated to represent the latest point in time to which the base RP can be rolled forward. As will be appreciated by those skilled in the art, the transaction log recording the RP modification may be examined to determine the latest point in time to which an RP can be rolled forward with respect to the base time of the RP. An RP having a base time may be rolled forward until a break or gap in time occurs with respect to recorded modifications in the transaction log. It should be noted that From step 1554, control proceeds to step 1556. If step 1552 evaluates to no, control proceeds directly to step 1556. If step 1512 evaluates to no, control proceeds directly to step 1556.

At step 1556, the latest recoverability time for the current RP is determined which may be represented as MAX(RPO (RS), RPO (REC)) where MAX determines the latest or most recent date/time. In this example, the RP can be restartable and/or recoverable so processing steps described provide for this possibility and then determining the latest point in time to which the RP can be restored in step 1556. At step 1558, a determination is made as to whether all RPs for the set have been processed. If not, control proceeds to step 1562 where current RP is assigned the next RP in the set and control proceeds to step 1506 to process this next RP. If step 1558 evaluates to yes, control proceeds to step 1560 where the RPO for the storage object may be determined based on the current time and the latest recoverability time possible from all the RPs in the set for the storage object. In other words, step 1560 may include determining which RP has the latest recoverability time of all RPs in the set, and this latest recoverability time for all RPs in the set is used in calculating the RPO for the storage object. As described elsewhere herein, the actual RPO may be represented as the difference between the current time and the latest or most recent recoverability time possible for the storage object based on all RPs in the set from step 1502. Step 1560 represents the RPO calculation for a storage object in which one or more RPs in the set from step 1502 are mapped to the same DP category. The RPO calculation determined by FIGS. 17 and 18 processing may be expressed as:

RPO(storage object,DP category,set of RPs)=current time−(MAX(recoverability time for all RPs in the set of RPs)

where MAX determines the latest or most recent date/time.

In the exemplary processing described in FIGS. 17 and 18, if the RP fails to meet the criteria for at least one of restartable or recoverable, the RPO may be the current time. An embodiment may also choose to filter out or ignore such RPs, for example, by performing preprocessing on the RPs so that such RPs are not processed using the steps of FIGS. 17 and 18.

The RPO calculation described in FIGS. 17 and 18 is performed with respect to a set of one or more RPOs for a same storage object which are mapped to a same DP category. More generally, the RPO calculation and processing described in FIGS. 17 and 18 may be performed for other sets of one or more RPs based on other characteristics and attributes than as illustrated. For example, the processing of FIGS. 17 and 18 for an RPO calculation may be performed for a single selected RP, RPs of a storage object included in a group of selected DP categories, RPs associated with one or more selected DP methods, a set of one or more RPs representing all RPs existing or available for a storage object (e.g., where the RPs are in different DP categories), and the like. In connection with FIG. 17, step 1502 may be generalized to use any selected set of one or more RPs for a storage object.

It will be appreciated by those skilled in the art that an embodiment may perform an RPO calculation in other ways which are variations to that as described in FIGS. 17 and 18. For example, an embodiment may perform processing regarding a recoverable RP (e.g., step 1512) prior to processing regarding a restartable RP (e.g., step 1508). As another variation, an embodiment may perform processing to determine an actual RPO in which processing for a restartable RP is performed only if it has been determined that the RP is not recoverable. For example, an RP may be both restartable and recoverable by meeting both sets of criteria described herein. In such a case for the RP, a first recoverability time determined in connection with the RP being restartable may be included in the set of one or more recoverability times determined in connection with the RP being recoverable. Based on the assumption that the first recoverability time determined in connection with the RP being restartable is included in the set of one or more recoverability times determined in connection with the RP being recoverable, an embodiment may perform processing which is a variation of that described in FIGS. 17 and 18. In such a case, an embodiment may perform processing for determining an RPO which will now be described in connection with FIGS. 18A and 18B.

Figure 18A:
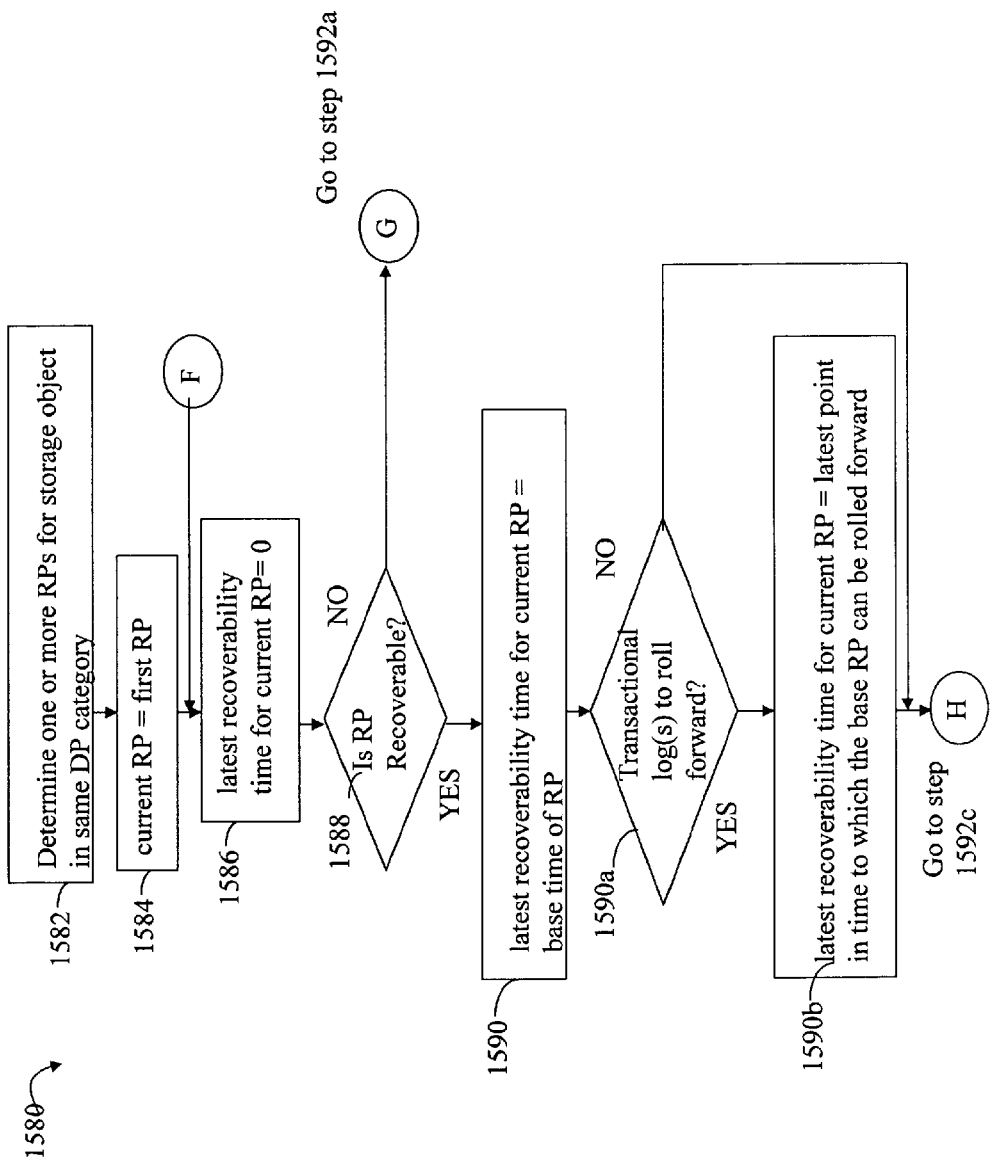
FIGS. 18A and 18B are flowcharts of processing steps that may be performed in another embodiment for performing an RPO (recovery point objective) calculation.
Figure 18B:
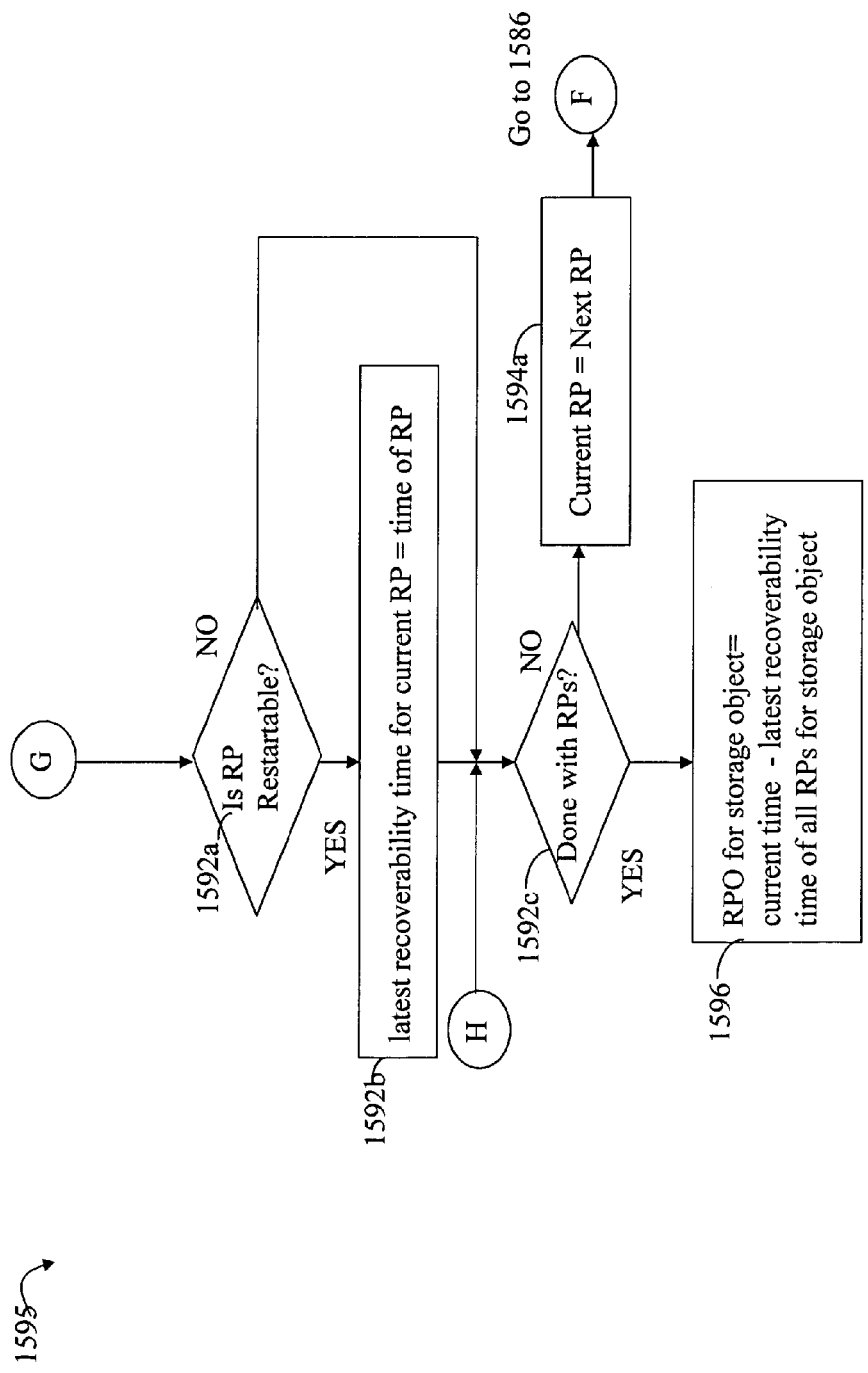

Referring to FIGS. 18A and 18B, shown are flowcharts of processing steps of a second technique that may be performed in an embodiment in connection with performing an RPO calculation in which processing for a restartable RP is performed only if it has been determined that the RP is not recoverable. Steps of the flowcharts of FIGS. 18A and 18B are similar to those described in connection with FIGS. 17 and 18. Steps 1582, 1584, and 1586 are respectively similar to steps 1502, 1504 and 1506 of FIG. 17. Steps 1588, 1590, 1590a, and 1590b are respectively similar to steps 1512, 1514, 1552 and 1554 of FIGS. 17 and 18. Steps 1592c, 1594a and 1596 are respectively similar to steps 1588, 1562 and 1560 of FIG. 18.

At step 1582, a set of one or more RPs for the storage object are determined. Each RP in the set is included in a same DP category. At step 1584, current RP is assigned the first RP in the set. At step 1586, a variable indicating the latest recoverability time for the current RP is initialized to zero (0). At step 1588, a determination is made as to whether the current RP is recoverable. If so, control proceeds to step 1590 where the latest recoverability time for the current RP is determined to be the base time for the recoverable RP. At step 1590a, a determination is made as to whether there is a transactional log allowing the current RP to be rolled forward in time. If step 1590a evaluates yes, control proceeds to step 1590b where the latest recoverability time for the current RP is updated to be the latest point in time to which the base RP can be rolled forward using the transactional log(s). From step 1590b control proceeds to step 1592c. If step 1590a evaluates to no, control also proceeds to step 1592c.

If step 1588 evaluates to no, control proceeds to step 1592a where a determination is made as to whether the current RP is restartable. If step 1592a evaluates to no, control proceeds to step 1592c. If step 1592a evaluates to yes, control proceeds to step 1592b where the latest recoverability time for the current RP is determined to be the time of the current RP. Control proceeds to step 1592c.

At step 1592c, a determination is made as to whether all RPs in the set have been processed. If not, current RP is assigned the next RP in the set in step 1594a, and control proceeds to step 1586. If step 1592c evaluates to yes, control proceeds to step 1596 where the RPO for the storage object is determined as the difference between the current time and the latest recoverability time of all the RPs in the set for the storage object.

It should be noted that, as described above in connection with FIGS. 17 and 18, the processing of FIGS. 18A and 18B may be more generally performed with respect to a set of one or more RPs selected using other criteria than a same DP category for a storage object.

Figure 19:
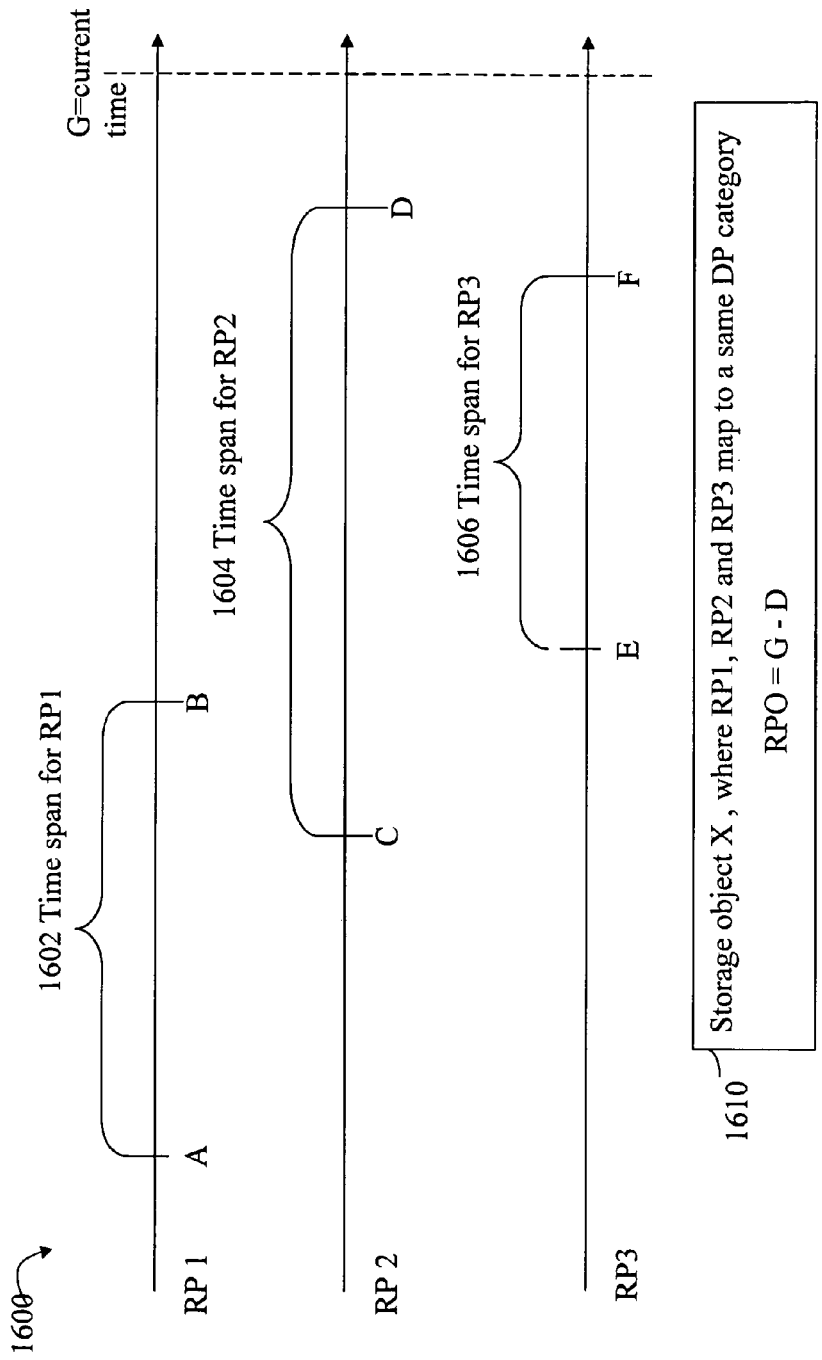
FIG. 19 is an example illustrating an RPO for a storage object in accordance with techniques herein in an embodiment.

Referring to FIG. 19, shown is an example illustrating determination of an actual RPO for a storage object in an embodiment in accordance with techniques described herein. For purposes of the illustrated example 1600, a storage object X may have 3 associated RPs—denoted RP1, RP2 and RP3—where the 3 RPs are mapped to the same DP category. In the example 1600, shown are 3 time lines where each time line corresponds to one of the RPs in the set of RPs for the storage object X. Each of the RPs in the set may be recoverable and have an associated log file which provides for rolling the respective RP forward in time. RP 1 is illustrated as having a base or initial recoverability time of A which can be rolled forward in time to time B. Thus, element 1602 denoting the time span for RP1 may represent the possible recoverability points for RP1 with B representing the latest possible recoverability point for RP1. RP 2 is illustrated as having a base or initial recovery time of C which can be rolled forward in time to time D. Thus, element 1604 denoting the time span for RP2 may represent the possible recoverability points for RP2 with D representing the latest possible recoverability point for RP2. RP3 is illustrated as having a base or initial recovery time of E which can be rolled forward in time to time F. Thus, element 1606 denoting the time span for RP3 may represent the possible recoverability points for RP3 with F representing the latest possible recoverability point for RP3. G represents the current time. As represented by 1610, the actual RPO calculation for the storage object X for a DP category where RP1, RP2 and RP3 map to the same DP category may be expressed as G–D where D represents the latest recoverability time possible of all 3 RPs in the set.

It should be noted that elements 1602 1604 and 1606 represent time spans which are continuous or have no break in time with respect to a base time associated with the illustrated RPs.

Referring to FIGS. 17 and 18 in connection with performing processing for the example 1600 of FIG. 19, step 1556 determines the latest recoverability time for each of RP1, RP2 and RP3, respectively, as B, D and F. Step 1560 determines the latest recoverability time for all RPs (D) from B, D, and F for use in performing the RPO calculation for the storage object for the DP category to which each of the RPs are mapped.

Referring to FIGS. 18A and 18B in connection with performing processing for the example 1600 of FIG. 19, step 1590b determines the latest recoverability time for each of RP1, RP2 and RP3, respectively, as B, D and F. Step 1596 determines the latest recoverability time for all RPs (D) from B, D, and F for use in performing the RPO calculation for the storage object for the DP category to which each of the RPs are mapped.

What will now be described is another exemplary use of the restartable and recoverable RP attributes and related processing in connection with determining whether an RP can be rolled forward in time. For example, a user may inquire as to whether an RP can be rolled forward to another later point in time beyond a base time or initial time. If so, the user may want to select a time from a range of possible recoverability times.

Figure 20:
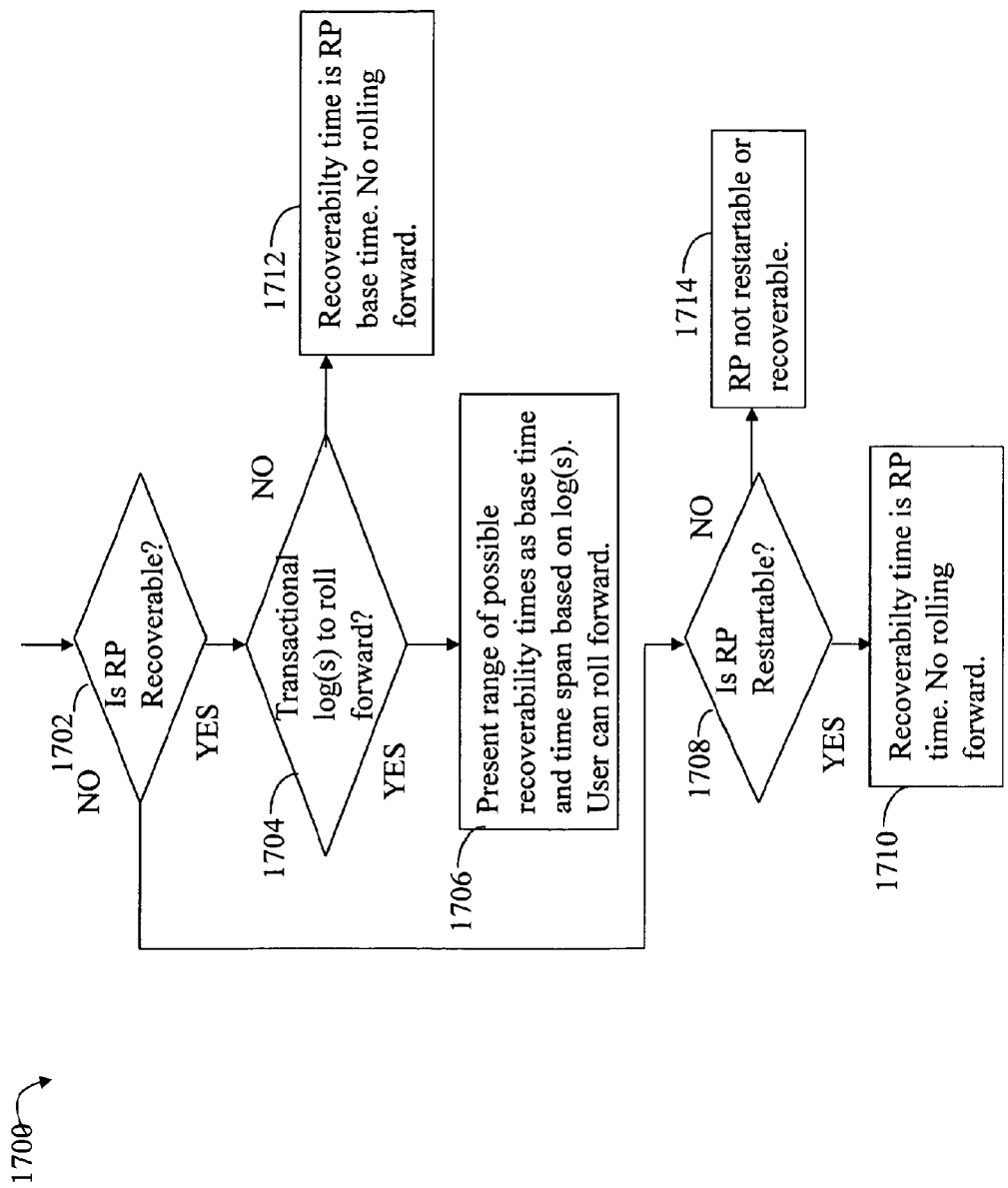
FIG. 20 is a flowchart of processing steps that may be performed in an embodiment in connection with determining whether a recovery point can be rolled forward in time.

Referring to FIG. 20, shown is a flowchart of processing steps that may be performed in an embodiment in connection with determining whether an RP can be rolled forward in time in accordance with techniques described herein. The steps of flowchart 1700 utilize the restartable and recoverable attribute determination for an RP. Flowchart 1700 describes processing that may be performed with respect to a single RP. At step 1702, a determination is made as to whether the RP is recoverable. If so, control proceeds to step 1704 where a determination is made as to whether there are one or more transactional logs which can be used to roll the recoverable RP forward in time. It should be noted that, as described elsewhere herein, step 1704 may include examining one or more transactional logs to determine whether there is any break or gap in time with respect to the base time of the recoverable RP. A recoverable RP can be rolled forward from the base time until there is a gap or break in time with respect to recorded modifications in the log(s). If step 1704 evaluates to no, control proceeds to step 1712 where the recoverability time is the RP base time and cannot be rolled forward to a later point in time. If step 1704 evaluates to yes, control proceeds to step 1706 where it is determined that the RP can be rolled forward. Step 1706 may include determining the possible recoverability times for the RP and representing the possible recoverability times as a time span ranging from the base time of the RP to the latest point in time to which the RP can be rolled forward in accordance with the transactional log(s). A user may be presented with the range of possible recoverability times for selection of a point in time to which the RP is to be rolled forward when restored.

If step 1702 evaluates to no, control proceeds to step 1708 where a determination is made as to whether the RP is restartable. If step 1708 evaluates to no, control proceeds to step 1714 where it is determined that the RP is not restartable or recoverable. If step 1708 evaluates to yes, control proceeds to step 1710 where it is determined that the RP cannot be rolled forward and the possible recoverability time is the single time at which the RP can be recovered.

An embodiment may perform the processing of FIG. 20 for a single RP in making a determination as to whether or not an RP can be rolled forward in time. The steps of FIG. 20 may also be performed as part of processing performed to determine and present to a user (e.g., via a graphical or other data display) a time span with a range of possible recoverability times when the RP is recoverable and can be rolled forward. The user may make a selection from the foregoing so that the RP can be restored (e.g., rolled forward) to a particular point in time in accordance with the selection.

Figure 21:
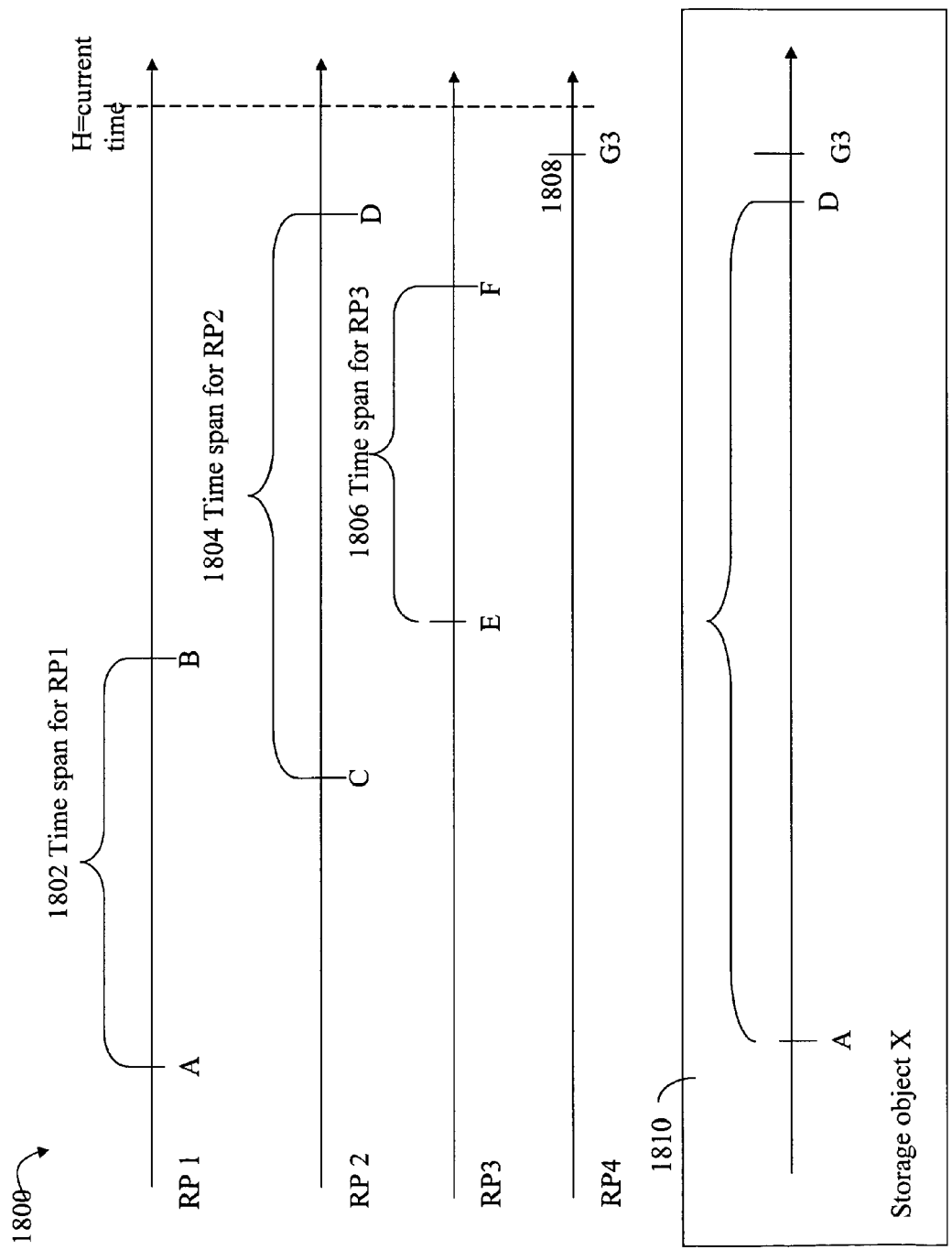
FIG. 21 is an example illustrating recoverability times for a storage object having multiple recovery points in an embodiment using techniques herein.

An embodiment may perform processing of FIG. 20 with respect to multiple RPs for a single storage object to be recovered. Such an example is illustrated in FIG. 21. For purposes of this example 1800, a set of four RPs—denoted RP1, RP2, RP3 and RP4—may be associated with a same storage object X (e.g., each RP may include images for a different instance of the storage object). In the example 1800, shown are 4 time lines where each time line corresponds to one of the RPs in the set of 4 RPs for the storage object X. RP1, RP2 and RP3 may be recoverable and RP 4 may be restartable. Each of the RPs1-3 in the set may be recoverable and have an associated log file which provides for rolling the respective RP forward in time. RP 1 is illustrated as having a base or initial recoverability time of A which can be rolled forward in time to time B. Thus, element 1802 denoting the time span for RP1 may represent the possible recoverability points for RP1 with B representing the latest possible recoverability point for RP1. RP 2 is illustrated as having a base or initial recoverability time of C which can be rolled forward in time to time D. Thus, element 1804 denoting the time span for RP2 may represent the possible recoverability points for RP2 with D representing the latest possible recoverability point for RP2. RP 3 is illustrated as having a base or initial recoverability time of E which can be rolled forward in time to time F. Thus, element 1806 denoting the time span for RP3 may represent the possible recoverability points for RP3 with F representing the latest possible recoverability point for RP3. RP 4 is illustrated as having a recoverability time of G3.

In one embodiment, a user may be presented with information as represented in 1810 in connection with selecting a recoverability time indicating the point in time to which the storage object X will be recovered. Element 1810 may include a range of possible recoverability times which is a set union of the possible recoverability times for the 4 RPs in the illustrated set for the storage object X. For example, a user may wish to recover storage object X. In connection with performing this operation, an embodiment may determine and display the possible recoverability times for the storage object X using RPs for the storage object which may be from the same or different DP categories. The user may be presented with a view as represented by 1810 which may not provide any indication regarding the number of RPs used. Rather, from the user's perspective, the user may be presented with a collective time span view for the storage object and possible recoverability times. In this example, element 1810 represents the time span of possible recoverability times from which a user can select as a range from A-D and the time G3. The one or more possible recoverability times can be determined using the recoverable and restartable attributes and log files for each recoverable RP which can be rolled forward. It should be noted that the information displayed to the user in connection with element 1810 may indicate the time span for which coverage is provided for the storage object as well as gaps or holes in the time as illustrated (e.g., gap between D and G3).

Figure 22:
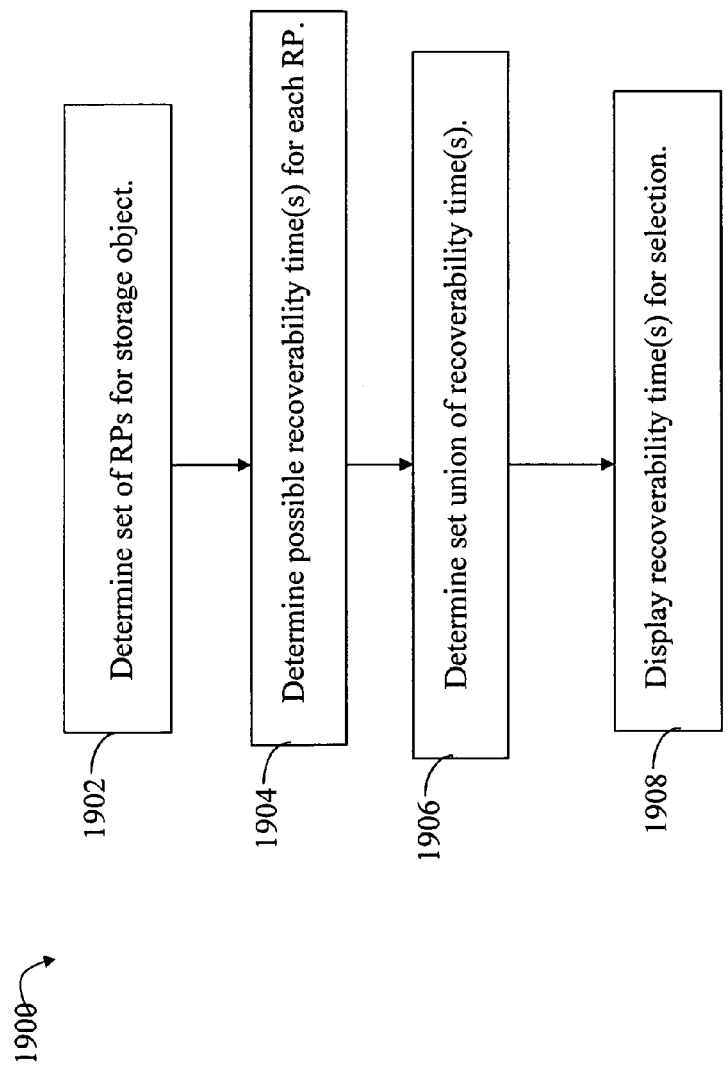
FIG. 22 is a flowchart of processing steps that may be performed in an embodiment to determine possible recoverability times for a storage object in an embodiment using techniques herein.

Referring to FIG. 22, shown is a flowchart of processing steps that may be performed in an embodiment to determine a set of possible recoverability times for a storage object in an embodiment in accordance with techniques herein. Flowchart 1900 summarizes processing as described in connection with the example illustrated in FIG. 21 to determine one or more points in time to which a storage object can be recovered where the storage object is associated with a set of one or more RPs where each RP includes a complete set of images for an instance of the storage object. At step 1902, the set of one or more RPs corresponding to the storage object is determined. At step 1904, the possible recoverability time(s) for each RP in the set are determined. Step 1904 may be performed as described elsewhere herein using the recoverable and restartable attribute determinations for each RP in the set. If an RP is recoverable and has log files that can be used to roll the RP forward in time, the log files may be used to determine the time span or range of possible recoverability times for the RP. If an RP is restartable, or is recoverable and cannot be rolled forward (e.g., no logs to roll the RP forward, or there is a break in time between the base RP time and a start time of the recorded modifications in the log), then a single recoverability time may be associated with the RP. At step 1906, a set union is performed with respect to the recoverability times determined in step 1904 for each RP. For example with reference to FIG. 21, element 1810 represents the results of performing the set union of the recoverability times for RP1, RP2, RP3 and RP4 illustrated, respectively, by 1802, 1804, 1806 and 1808. At step 1908, the results of performing the set union over the possible recoverability times for the RPs may be displayed. The times may be displayed, for example, to allow a user to select a time corresponding to the point in time to which the storage object is then restored. The times may be displayed in a variety of different ways such as using a graphical or other user interface presenting the possible time values, range, and the like, to the user.

With reference back to FIG. 21, it should be noted that a user may inquire as to whether there is coverage for a particular storage object for a specified time range. For example, a user may inquire as to whether the storage object X of FIG. 21 may be recovered for an inclusive recoverability time span or range from E to G3 (e.g., E denotes the starting time of the span 1806 of RP3 and G3 denotes the recoverability time 1808 for RP4). In response, processing may be performed by executing code to analyze the recoverability times for RP1, RP2, RP3 and RP4. It may be determined that possible recoverability times for storage object X do not include all times within the time span or range from E to G3. As an output to the user, an interface may specify that storage object X has recoverability times for the inclusive range E to D, and at time G3. The output may indicate a gap in recoverability times between D and up to G3.

In connection with examples described above, it should be noted that the possible recoverability times included in time span or range may vary with the particular data protection method, frequency, and the like, for the RPs.

In connection with processing described herein a determination may be made with respect to an RP as to whether the RP meets restartable criteria and also whether the RP meets recoverable criteria. However, an embodiment may utilize the techniques described herein for different uses in which it may not be necessary to determine whether an RP meets both restartable and recoverable criteria. It will be appreciated by those skilled in the art than an embodiment may utilize the techniques described herein for determining whether an RP is restartable with or without utilizing techniques described herein for determining whether an RP is recoverable depending on the particular application and usage. Similarly, an embodiment may utilize the techniques described herein for determining whether an RP is recoverable with or without utilizing techniques described herein for determining whether an RP is restartable depending on the particular application and usage.

Using the techniques herein, a user may inquire whether an RP is restartable and/or recoverable and processing may be performed to provide a response in accordance with criteria as described herein. Providing an indication as to whether the RP is recoverable and/or restartable may be used to provide information regarding the recoverability status of the storage object. Furthermore, some exemplary uses of the recoverable and/or restartable attributes for an RP are described herein.

As noted above, an RP that is restartable and not recoverable may not be rolled forward in time and has a single recoverability time. An RP that is recoverable and can be rolled forward (e.g., using one or more logs recording continuous, subsequent RP modifications from a base RP time) may have multiple recoverability times corresponding to the time range that the RP can be rolled forward. An RP may also be recoverable but may not be able to be rolled forward (e.g., no logs or there is a break in time from the base RP to the start time of the logs). In this latter case, the RP may also have a single recoverability time that is the base RP time. An RP may also meet both the restartable criteria and recoverable criteria so that the RP may be recovered as either a restartable RP or recoverable RP using different recovery processing. For example, a user may want to recover the RP as restartable and may use a first recovery process including the appropriate commands and associated ordering. For the same RP where a user wants to recover the RP as recoverable so that the RP can be optionally rolled forward in time, a second different recovery process may be performed. For example, the second recovery process may include restoring additional log files that may be used to roll the base RP forward in time. Such additional log files may not be needed if the user has selected to recover the RP as a restartable RP rather than as a recoverable RP.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for processing recovery points comprising:
   determining one or more storage objects for which data protection processing is performed, said data protection processing including copying data for each of said one or more storage objects to one or more data protection storage devices;
   determining one or more recovery points corresponding to each of said one or more storage objects; and
   for each of said one or more recovery points corresponding to each of said one or more storage objects, performing processing including determining whether said each recovery point is recoverable in accordance with recoverable criteria and whether said each recovery point is restartable in accordance with restartable criteria,
   wherein said restartable criteria includes one or more rules specifying that a recovery point that is restartable is dependent write consistent in which a plurality of data files comprising a restartable recovery point are synchronized with respect to a same write transaction,
   wherein a restartable recovery point is one for which after a set of images comprising said restartable recovery point is restored, data of the set of images is in a working state,
   wherein said recoverable criteria includes one or more rules specifying that a recoverable recovery point is a recovery point for which, after a set of images comprising the recoverable recovery point is restored, additional processing is performed to place data of the recoverable recovery point in a working state,
   wherein a set of one or more recoverability times for a first storage object is determined based on a set union of recoverability times for one or more recovery points associated with said first storage object,
   wherein if a first recovery point associated with said first storage object is recoverable and has at least one log file used to roll the first recovery point forward in time, the set of one or more recoverability times includes a time span corresponding to a range of time values indicated by said at least one log file,
   wherein if a second recovery point associated with said first storage object is restartable, the second recovery point cannot be rolled forward and the set of one or more recoverability times includes a second recoverability time for said second recovery point,
   wherein if a third recovery point associated with said first storage object is recoverable and cannot be rolled forward, the set of one or more recoverability times includes a third recoverability time for said third recovery point, and
   wherein said set of one or more recoverability times is displayed in connection with selecting a point in time for recovering the first storage object.

2. The method of claim 1, wherein said restartable criteria includes determining whether elements required to recover a storage object are included in images of a recovery point.

3. The method of claim 2, wherein said restartable criteria includes determining whether a recovery point is dependent write consistent, and whether images of the recovery point are created with a same protection action if required.

4. The method of claim 3, wherein said restartable criteria includes determining whether a recovery point is valid to assess a state of data in the recovery point related to whether the recovery point can be used to perform recovery for a storage object.

5. The method of claim 4, wherein determining whether a recovery point is valid in connection with said restartable criteria includes determining that no errors are generated as a result of data protection processing that creates images included in the recovery point.

6. The method of claim 1, wherein said recoverable criteria includes determining whether elements required to recover a storage object are included in images of a recovery point.

7. The method of claim 6, wherein said recoverable criteria includes determining whether a recovery point is valid to assess a state of data in the recovery point related to whether the recovery point can be used to perform recovery for a storage object.

8. The method of claim 7, wherein determining whether a recovery point is valid in connection with said recoverable criteria includes determining that no errors are generated when data protection processing creates images included in the recovery point.

9. The method of claim 7, wherein said recoverable criteria includes determining whether an application using data of a storage object is in a correct mode when a data protection process is performed for the storage object which creates images included in a recovery point.

10. The method of claim 9, wherein said correct mode is a backup mode that said application is required to be in when performing the data protection process, and said recoverable criteria includes determining whether corresponding actions exist in a file indicating whether processing is performed to place said application in said backup mode prior to performing the data protection process and, if required, whether processing is performed to take said application out of backup mode after performing the data protection process.

11. The method of claim 10, wherein at least one additional storage object is created while performing the data protection process creating images included in a recovery point, and said recoverable criteria includes determining whether said at least one additional storage object is covered by the recovery point.

12. The method of claim 1, wherein at least one recovery point is determined as both recoverable and restartable.

13. The method of claim 1, wherein, if a recovery point is recoverable, the method includes determining whether the recovery point is associated with one or more log files providing for rolling the recovery point forward in time, the recovery point reflecting a state of data of a corresponding storage object at a first point in time and the one or more log files being used to roll the recovery point forward in time to a second point in time subsequent to the first point in time.

14. The method of claim 1, wherein a restartable recovery point is a recovery point that cannot be rolled forward in time to reflect a state of the data of the recovery point at a later time.

15. The method of claim 1, wherein a recoverable recovery point is a recovery point that can be optionally rolled forward in time to reflect a state of data of the recovery point at a later time, wherein said additional processing reconstructs a working data set.

16. The method of claim 1, wherein at least one of said storage objects is a file system, data used by an application, a file, a directory, a physical device, a logical device, or a portion of a device.

17. A system comprising:
   at least one data protection storage device;
   at least one data protection server providing data protection for at least one storage object by copying data for said at least one storage object to said at least one data protection storage device; and
   a computer readable medium comprising executable code stored thereon for:
      determining one or more storage objects for which said data protection is provided, said data protection processing including copying data for each of said one or more storage objects to one or more data protection storage devices;
   determining one or more recovery points corresponding to each of said one or more storage objects, wherein each of said one or more recovery points that corresponds to a corresponding storage object includes a set of images to be restored in order to recover the corresponding storage object;
   for each of said one or more recovery points corresponding to each of said one or more storage objects, performing processing including determining whether said each recovery point is recoverable in accordance with recoverable criteria and whether said each recovery point is restartable in accordance with restartable criteria,
   wherein said restartable criteria includes one or more rules specifying that a recovery point that is restartable is dependent write consistent in which a plurality of data files comprising a restartable recovery point are synchronized with respect to a same write transaction,
   wherein a restartable recovery point is one for which after a set of images comprising said restartable recovery point is restored, data of the set of images is in a working state, and
   wherein said recoverable criteria includes one or more rules specifying that a recoverable recovery point is a recovery point for which, after a set of images comprising the recoverable recovery point is restored, additional processing is performed to place data of the recoverable recovery point in a working state;
   determining a set of recoverability times for a first storage object based on a set union of recoverability times for recovery points associated with said first storage object,
   wherein a first recovery point associated with said first storage object is recoverable and at least one log file is used to roll the first recovery point forward in time, the set of recoverability times including a time span corresponding to a range of time values indicated by said at least one log file,
   wherein if a second recovery point associated with said first storage object is restartable, the second recovery point cannot be rolled forward and the set of one or more recoverability times includes a second recoverability time for said second recovery point, and
   wherein if a third recovery point associated with said first storage object is recoverable and cannot be rolled forward, the set of one or more recoverability times includes a third recoverability time for said third recovery point; and
   displaying the set of recoverability times in connection with selecting a point in time for recovering the first storage object.

18. A non-transitory computer readable medium comprising code stored thereon for processing recovery points, the non-transitory computer readable medium comprising code stored thereon for:
   determining one or more storage objects for which data protection processing is performed, said data protection processing including copying data for each of said one or more storage objects to one or more data protection storage devices;
   determining one or more recovery points corresponding to each of said one or more storage objects; and
   for each of said one or more recovery points corresponding to each of said one or more storage objects, performing processing including determining whether said each recovery point is recoverable in accordance with recoverable criteria and whether said each recovery point is restartable in accordance with restartable criteria,
   wherein said restartable criteria includes one or more rules specifying that a recovery point that is restartable is dependent write consistent in which a plurality of data files comprising a restartable recovery point are synchronized with respect to a same write transaction,
   wherein a restartable recovery point is one for which after a set of images comprising said restartable recovery point is restored, data of the set of images is in a working state,
   wherein said recoverable criteria includes one or more rules specifying that a recoverable recovery point is a recovery point for which, after a set of images comprising the recoverable recovery point is restored, additional processing is performed to place data of the recoverable recovery point in a working state,
   wherein a set of one or more recoverability times for a first storage object is determined based on a set union of recoverability times for one or more recovery points associated with said first storage object,
   wherein if a first recovery point associated with said first storage object is recoverable and has at least one log file used to roll the first recovery point forward in time, the set of one or more recoverability times includes a time span corresponding to a range of time values indicated by said at least one log file,
   wherein if a second recovery point associated with said first storage object is restartable, the second recovery point cannot be rolled forward and the set of one or more recoverability times includes a second recoverability time for said second recovery point,
   wherein if a third recovery point associated with said first storage object is recoverable and cannot be rolled forward, the set of one or more recoverability times includes a third recoverability time for said third recovery point, and
   wherein said set of one or more recoverability times is displayed in connection with selecting a point in time for recovering the first storage object.

* * * * *